US012657837B2

(12) United States Patent
Lu et al.

(10) Patent No.: US 12,657,837 B2
(45) Date of Patent: Jun. 16, 2026

(54) SOCIAL INTERACTION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Xinqi Lu, Shenzhen (CN); Anqi Li, Shenzhen (CN); Yan Wang, Shenzhen (CN); Shicheng Fu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 320 days.

(21) Appl. No.: 18/324,593

(22) Filed: May 26, 2023

(65) Prior Publication Data
US 2023/0298290 A1 Sep. 21, 2023

Related U.S. Application Data

(63) Continuation of application No. PCT/CN2022/109448, filed on Aug. 1, 2022.

(30) Foreign Application Priority Data

Jan. 29, 2022 (CN) ........................ 202210112298.X

(51) Int. Cl.
*G06T 19/00* (2011.01)
*G06F 3/0482* (2013.01)
(Continued)

(52) U.S. Cl.
CPC .......... *G06T 19/006* (2013.01); *G06F 3/0482* (2013.01); *H04L 51/046* (2013.01); *H04L 51/52* (2022.05); *G06T 2200/24* (2013.01)

(58) Field of Classification Search
None
See application file for complete search history.

(56) References Cited

U.S. PATENT DOCUMENTS 6,249,806 B1 * 6/2001 Kohda ............. H04N 21/25883
348/E7.071
8,046,259 B1 * 10/2011 Siegel ................... G06F 3/0481
705/14.73
(Continued)

FOREIGN PATENT DOCUMENTS

CN 108984087 A 12/2018
CN 109445577 A 3/2019
(Continued)

OTHER PUBLICATIONS

Valve, "Custom Games", 2015, URL: https://www.dota2.com/reborn/part2 (Year: 2015).*

(Continued)

*Primary Examiner* — David H Chu
(74) *Attorney, Agent, or Firm* — Crowell & Moring LLP

(57) ABSTRACT

A social interaction method, apparatus, device, storage medium, and a program product are provided. A social service page is displayed that includes a first real scene room. The first real scene room corresponds to a first virtual social scene. A target virtual image corresponding to a target social object is displayed in the first virtual social scene in response to receiving an interactive operation on the first virtual social scene. The target social object is controlled by the terminal.

19 Claims, 14 Drawing Sheets

(51) Int. Cl.
  H04L 51/046      (2022.01)
  H04L 51/52       (2022.01)

(56)            References Cited

U.S. PATENT DOCUMENTS

| 10,270,772 | B2 * | 4/2019 | Ball | H04L 63/126 |
| 11,159,534 | B1 * | 10/2021 | Arino de la Rubia | G06Q 50/01 |
| 2008/0262910 | A1 * | 10/2008 | Altberg | G06Q 30/02 |
| | | | | 705/14.69 |
| 2008/0306817 | A1 * | 12/2008 | Amidon | H04N 21/812 |
| | | | | 705/14.67 |
| 2010/0287510 | A1 * | 11/2010 | Cragun | G09B 21/00 |
| | | | | 715/848 |
| 2011/0307299 | A1 * | 12/2011 | Brignull | G06Q 30/0269 |
| | | | | 705/7.33 |
| 2013/0031475 | A1 * | 1/2013 | Maor | A63F 13/533 |
| | | | | 715/706 |
| 2013/0045803 | A1 * | 2/2013 | Kang | A63F 13/00 |
| | | | | 463/42 |
| 2017/0063745 | A1 * | 3/2017 | Banerjee | G06Q 30/0203 |
| 2019/0130701 | A1 * | 5/2019 | Simons | H04L 9/3226 |
| 2019/0156575 | A1 * | 5/2019 | Korhonen | H04N 13/332 |
| 2019/0205934 | A1 * | 7/2019 | Lin | G06Q 30/0256 |
| 2020/0128053 | A1 * | 4/2020 | Rosanuru | G06Q 20/407 |
| 2020/0133439 | A1 * | 4/2020 | Trim | H04L 51/216 |
| 2022/0167036 | A1 * | 5/2022 | Lin | H04N 21/25866 |
| 2025/0061685 | A1 * | 2/2025 | Kapadia | G06T 7/20 |

FOREIGN PATENT DOCUMENTS

| CN | 110020881 A | 7/2019 |
| CN | 110096325 A | 8/2019 |
| CN | 111314210 A | 6/2020 |
| CN | 112073742 A | 12/2020 |
| CN | 113181645 A | 7/2021 |
| CN | 113965812 A | 1/2022 |

OTHER PUBLICATIONS

International Search Report dated Oct. 31, 2022 (3 pages) from PCT Priority Application PCT/CN2022/109448 filed Aug. 1, 2022 (in Chinese text).

Written Opinion dated Oct. 31, 2022 (4 pages) from PCT Priority Application PCT/CN2022/109448 filed Aug. 1, 2022 (in Chinese text).

Chinese-language Office Action issued in Chinese Application No. 202210112298.X dated Oct. 28, 2025 with English translation (28 pages).

* cited by examiner

S201

Display a social service page

S202

Display a target virtual image corresponding to a target social object in the first virtual social scene in response to receiving an interactive operation on the first virtual social scene Transparent Non-transparent (1)                (2)

S401. Display a social service page

S402. Switch a first real scene room to a second real scene room in the social service page

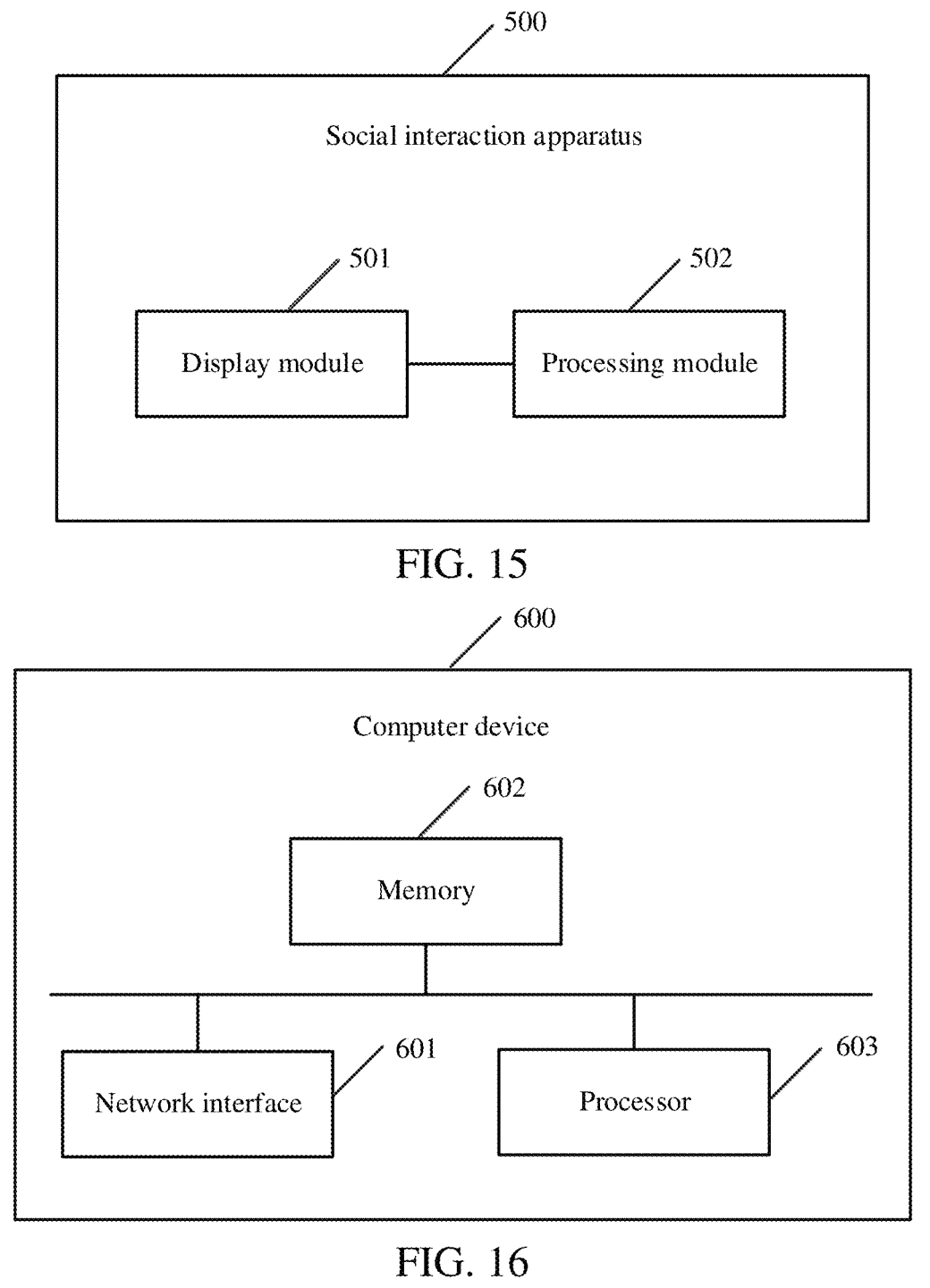

500

Social interaction apparatus 501                                502

Display module                 Processing module

Computer device

602

Memory 601                                603

Network interface              Processor

FIG. 16

SOCIAL INTERACTION METHOD AND APPARATUS, DEVICE, STORAGE MEDIUM, AND PROGRAM PRODUCT

RELATED APPLICATION

The present application is a continuation of PCT application PCT/CN2022/109448, filed Aug. 1, 2022 and which claims priority to Chinese Patent Application No. 202210112298.X, entitled "SOCIAL INTERACTION METHOD AND APPARATUS, DEVICE, STORAGE MEDIUM, AND PROGRAM PRODUCT" filed on Jan. 29, 2022. All are incorporated by reference in their entirety.

FIELD OF THE TECHNOLOGY

The present subject matter relates to the field of computer technologies, and in particular, to a social interaction method and apparatus, a device, a storage medium, and a program product.

BACKGROUND

With the development of Internet technologies, more and more applications are developed and run in computer devices, such as payment applications, social applications, and shopping applications. The applications carry various services, for example, social interaction functions of the applications can be used to transmit information, so as to implement online communications. Social applications are used as an example. There are various types of services in the social applications, such as chat services and dynamic publishing services. Through the social applications, others can be contacted in a timely and convenient manner, and other interesting services can be experienced.

However, service forms of the social applications are mainly based on jumps of flat user interfaces, and require switching back and forth between interfaces in different social interactions, resulting in low human-machine interaction efficiency of the social applications.

BRIEF SUMMARY

The present subject matter provides a social interaction method and apparatus, a device, a storage medium, and a program product to improve human-machine interaction efficiency of social applications.

An example of the present subject matter provides a social interaction method, performed by a terminal, including:

displaying a social service page, the social service page displaying a first real scene room, and the first real scene room corresponding to a first virtual social scene; and displaying a target virtual image corresponding to a target social object in the first virtual social scene in response to receiving an interactive operation on the first virtual social scene, the target social object being an object controlled by the terminal.

An example of the present subject matter provides a social interaction apparatus, including: a display module, configured to display a social service page, the social service page displaying a first real scene room, and the first real scene room corresponding to a first virtual social scene; and a processing module, configured to display a target virtual image corresponding to a target social object in the first virtual social scene in response to receiving an interactive operation on the first virtual social scene, the target social object being an object controlled by a terminal that displays the social service page.

Correspondingly, an example of the present subject matter provides a computer device, including: a memory, a processor, and a network interface, the processor being connected to the memory and the network interface, where the network interface is used to provide a network communication function, the memory is used to store program code, and the processor is used to call the program code to perform the method in the example of the present subject matter.

Correspondingly, an example of the present subject matter provides a non-transitory computer-readable storage medium, the non-transitory computer-readable storage medium storing a computer program that, when executed by a processor, implements the method in the example of the present subject matter.

Correspondingly, an example of the present subject matter provides a computer program product or a computer program, the computer program product or the computer program including computer instructions, the computer instructions being stored in a non-transitory computer-readable storage medium, a processor of a computer device reading the computer instructions from the non-transitory computer-readable storage medium and executing the computer instructions, and the computer device being enabled to perform the method in the example of the present subject matter.

By implementing the examples of the present subject matter, a first real scene room may be displayed on a social service page, the first real scene room displaying a first virtual social scene; and a target virtual image corresponding to a target social object may be displayed in the first real scene room in response to an interactive operation of the target social object on the first virtual social scene. In this case, the target social object may enter the first real scene room through the target virtual image to participate in social interaction, so that the target social object has more intuitive visual feedback, immersion of the target social object is enhanced, and reality and fun of the social interaction are increased.

Moreover, in the examples of the present subject matter, a real scene room and a virtual social scene corresponding to the real scene room are provided in a social application, so that an interactive operation can be received and an interaction corresponding to the interactive operation can be implemented in the virtual social scene. Different interactions are integrated into the same real scene room to avoid switching back and forth between a plurality of social interfaces and improve human-machine interaction efficiency of the social application.

BRIEF DESCRIPTION OF THE DRAWINGS

FIG. 15 is a schematic structural diagram of a social interaction apparatus according to an example of the present subject matter.

FIG. 16 is a schematic structural diagram of a computer device according to an example of the present subject matter.

DETAILED DESCRIPTION

Figure 1:
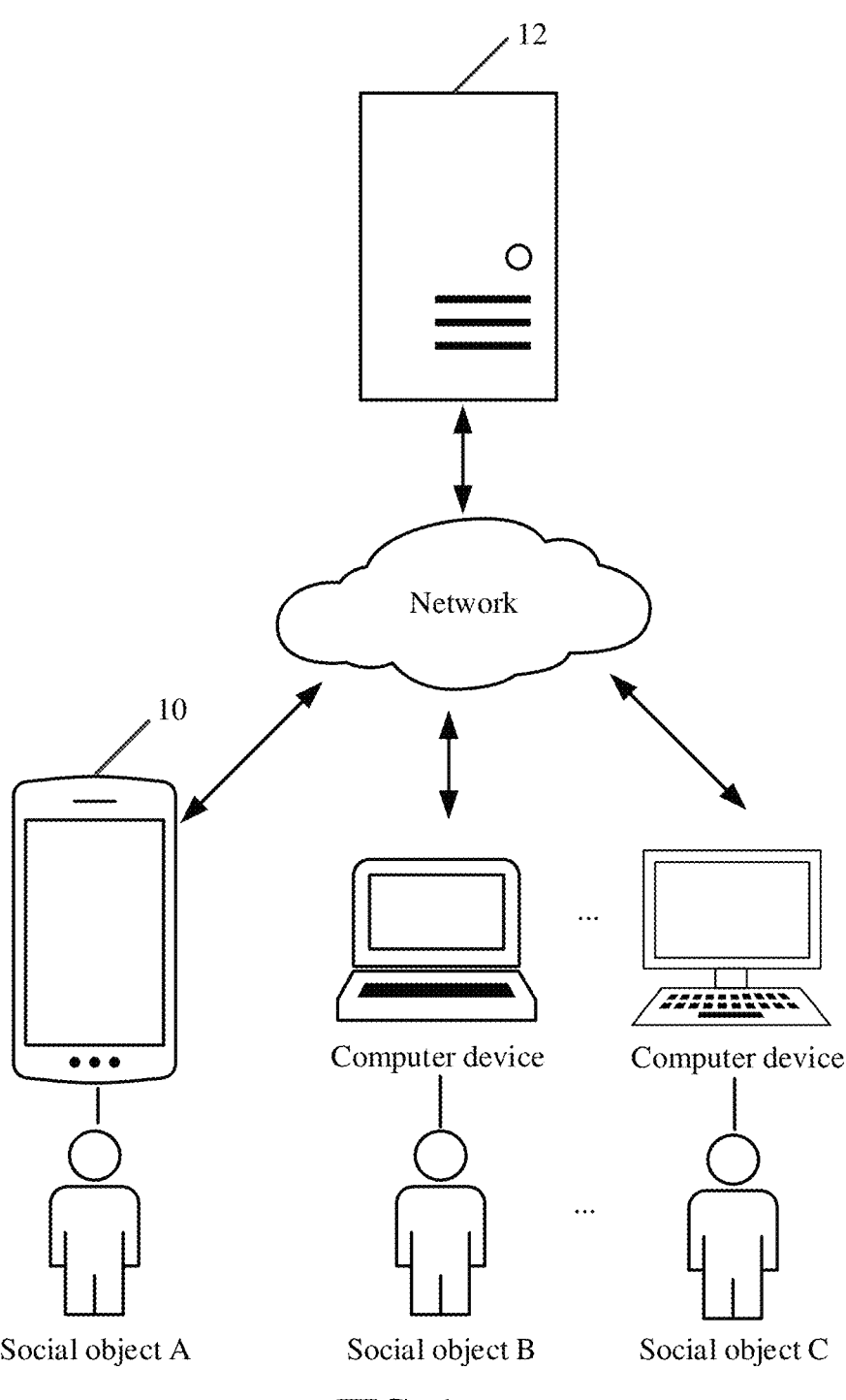
FIG. 1 is an architecture diagram of a social interaction system according to an example of the present subject matter.

First, terms that may be referred to in examples of the present subject matter are described.

(1) Social client: The social client may refer to a social APP (Application) that corresponds to a server and provides local services to customers. For example, the social client may include but is not limited to: an instant messaging APP, a map social APP, a content interaction APP, a game social APP, an installation-free APP (an application that a user may open and use by scan or search without being downloaded or installed, such as an applet), and the like. The social client may alternatively refer to a website with social session functions that corresponds to a server and provides local services to customers, such as a social website or a forum.

(2) AIO: The full English name is All In One, which refers to an interactive scene/window when a user chats with friends. In APPs with social session functions, for example, in some instant messaging applications, a user participates in many different types of sessions with friends, groups, public accounts, and the like.

(3) Social service page: The social service page refers to a service page provided based on social functions, and may present two-dimensional or three-dimensional content. For example, a service form of a social application is mainly based on jumps of flat UI (User Interface) pages, and information content and states of host and guest social objects are displayed through a UI. In the examples of the present subject matter, the social service page includes a three-dimensional real scene room and a two-dimensional or three-dimensional UI function control.

When the UI function control is a two-dimensional control, such as a message input field, the UI function control receives an input operation in the message input field. When the UI function control is a three-dimensional control, such as a prop control in a three-dimensional real scene room, the UI function control receives a control operation on a virtual image in the three-dimensional real scene room to control the virtual image to touch the prop control.

(4) Real scene room: The room refers to a virtual logical space with some functions, and may be a plane space presented on a page or a three-dimensional space presented on a page.

The room may also be referred to as a box, a channel, a community, a circle, a hall, or the like. For example, a chat room may also be referred to as a chat box, and a live room may also be referred to as a live channel. The real scene room in the examples of the present subject matter refers to a three-dimensional simulation building that carries corresponding service functions of an application and occupies a three-dimensional space in a three-dimensional exploration space. The real scene room is a three-dimensional virtual logical space having some functions. For example, the real scene room is a virtual logical space created by an account of at least one social object in a social application. In the examples of the present subject matter, the real scene room is equivalent to a room, unless otherwise specified.

(5) Virtual social scene: The virtual social scene refers to a scene of social communication based on the Internet, and may include but is not limited to: an individual social session scene, a group social session scene, a game competition scene, a social operation activity scene, and the like. The individual social session scene refers to a scene where two social objects engage in a social session. The group social session scene refers to a scene where two or more social objects participate in a social session together. The game competition scene refers to a scene where two or more social objects are divided into at least two camps, and a game competition is conducted by the at least two camps. The social operation activity scene refers to a scene of an operation activity initiated by a server background or any or more social objects to invite other social objects to participate.

(6) Virtual image: The virtual image generally refers to a virtual character image used for Internet social interaction, and expressions, manners, dress, and the like of the virtual character image may be personalized. In this example, the virtual image refers to a virtual character image used to represent a social object for social interaction in a virtual social scene. The virtual character image is used as an example of the virtual image. In some examples, the virtual image may alternatively be a virtual animal image, a virtual animation image, and the like, which is not limited in this example.

(7) Meshbox: The Meshbox refers to a container for placing a model in a 3-dimension (3D) engineering scene, and the model may contain a person, a building, an article, or the like.

(8) 3D scene assets: Materials that need to be loaded and rendered to build a scene in a 3D engineering.

The following describes an architecture of a social interaction system according to an example of the present subject matter with reference to the accompanying drawing.

FIG. 1 is a schematic architecture diagram of a social interaction system according to an example of the present subject matter. As shown in FIG. 1, the architecture diagram includes a computer device 10 and a server 12. The computer device 10 and the server 12 communicate through a network. The computer device 10 may be in communication connection with the server 12 in a wired or wireless manner and exchange data with the server 12.

The computer device refers to a device used by a social object who participates in a social interaction. The computer device may include but is not limited to a smart phone, a tablet computer, a smart wearable device, a smart voice interaction device, a smart appliance, a personal computer, a vehicle terminal, and the like, and the present subject matter is not limited thereto. A quantity of computer devices is not limited in the present subject matter. The server 12 may be an independent physical server, or may be a server cluster or distributed system including a plurality of physical servers, or may be a cloud server providing basic cloud computing services such as cloud services, cloud databases, cloud computation, cloud functions, cloud storage, network services, cloud communication, middleware services, domain name services, security services, CDN, big data, and artificial intelligence platforms, but is not limited thereto. A quantity of servers 12 is not limited in the present subject matter. Unless otherwise specified, in subsequent examples of the present subject matter, the computer device 10 refers to a device used by a target social object, and the target social object may refer to any social object who participates in a social interaction.

In a feasible implementation of the present subject matter, a social client is installed and run in the computer device 10, and social objects may engage in social interaction with other social objects based on social clients run in respective computer devices. For example, social object A may use the social client run in the computer device 10 for social interaction with social object B. For another example, social object A, social object B, and social object C may all use social clients run in respective computer devices for social interaction. The social client may provide a social service page, the social service page is used to present one or more real scene rooms, and each real scene room is used to display a virtual social scene. The target social object may flexibly switch real scene rooms to browse different virtual social scenes. The target social object may be in a plurality of real scene rooms at the same time, and the computer device may display virtual social scenes corresponding to the plurality of real scene rooms at the same time. For some computer devices with smaller display screens, the virtual social scenes corresponding to the plurality of real scene rooms may be displayed through a foreground, a background, or the like. Further, the target social object may also enter a virtual social scene corresponding to any real scene room and engage in social interaction with other social objects in the virtual social scene.

In one implementation, the server 12 may be a background server corresponding to social clients, and may be used to manage the social clients and provide service support for the social clients. The service support may include but is not limited to: recommending various real scene rooms for the social clients participating in social interactions, so as to achieve the goal of recommending each virtual social scene; forwarding session messages for the social clients participating in social interactions; and synchronizing position information of a virtual image in a virtual social scene for each social client, and the like.

The following briefly describes a social interaction method referred to by the system shown in FIG. 1.

(1) The computer device 10 displays a social service page in a social client, the social service page containing a first real scene room, and the first real scene room corresponding to a first virtual social scene, that is, the first real scene room being used to display the first virtual social scene. The first virtual social scene includes one or more virtual props, such as virtual desk props, virtual bench props, virtual high-rise props, and virtual traffic props. Different virtual social scenes have different virtual prop layouts, the virtual prop layouts may be adjusted according to scenes, and the different virtual props may also be bound with different interactive functions. Here, the first real scene room may be any real scene room in the social client, and the first virtual social scene may be any virtual social scene recommended by the server 12 to a target social object. The first virtual social scene may include but is not limited to: a group social session scene, a game competition scene, a social operation activity scene, and the like. It may be understood that the "real scene" mentioned in the examples of the present subject matter is used to describe simulation of a virtual room or design close to a real scene.

(2) If the target social object is interested in the first virtual social scene displayed by the computer device 10 on the social service page, the target social object may initiate an interactive operation on the first virtual social scene, for example, click a virtual prop in the first virtual social scene; or chat with an existing virtual image in the first virtual social scene. Through the interactive operation, the target social object may join in the first virtual social scene, the computer device 10 displays a target virtual image corresponding to the target social object in the first virtual social scene, and then the target virtual image represents the target social object to engage in social interactions in the first virtual social scene.

(3) Real scene rooms displayed by the computer device 10 on the social service page support switching. For example, the target social object may switch between the real scene rooms on the social service page through a room switching operation (for example, sliding up and down on the social service page). For another example, the target social object may automatically switch a real scene room being displayed on the social service page according to display duration of the real scene room. For another example, the target social object may automatically switch or close a real scene room being displayed on the social service page when there is no social interaction operation in the real scene room for a long time. Through the mechanism that the real scene rooms support switching, the social service page may adjust recommended content in a dynamic and timely manner, provide the target social object with an experience of content interactive recommendation in a video streaming manner, and also guide the target social object to participate in more virtual social scenes for social interactions, thereby improving social interaction rates.

By implementing the examples of the present subject matter, a first real scene room which displays a first virtual social scene may be displayed on a social service page, and a target virtual image corresponding to a target social object may be displayed in the first real scene room in response to an interactive operation of the target social object for the first virtual social scene. In this case, the target social object may enter the first real scene room through the target virtual image to participate in social interaction, so that the target social object has more intuitive visual feedback, immersion of the target social object is enhanced, and reality and fun of the social interaction are increased. In addition, the first real scene room on the social service page further supports flexible switching. The flexible switching enables the target social object to browse more virtual social scenes easily, provides the target social object with an experience of content recommendation in a video streaming manner, and may also guide the target social object to participate in more virtual social scenes for social interactions, thereby improving social interaction rates.

The following describes the social interaction method provided in the examples of the present subject matter with reference to the accompanying drawings. Unless otherwise specified, the social interaction method mentioned in subsequent examples of the present subject matter may be executed by the computer device 10 in the system shown in FIG. 1, the computer device 10 is a device used by a target social object, and a social client is run in the computer device 10.

Figure 2:
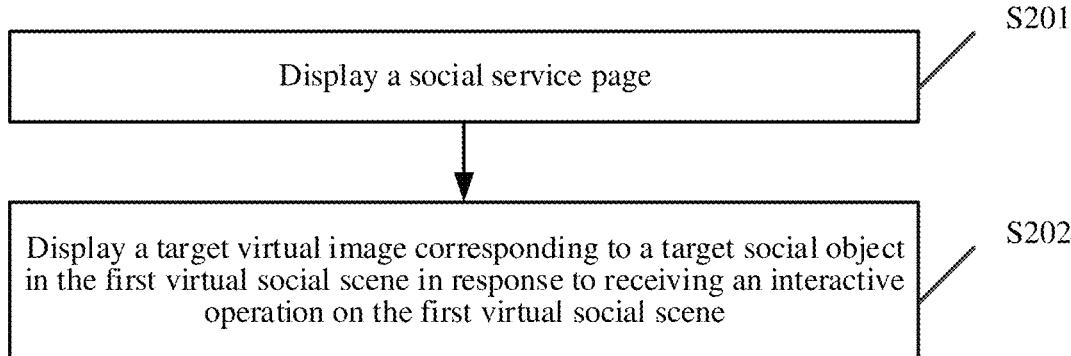
FIG. 2 is a schematic flowchart of a social interaction method according to an example of the present subject matter.

Refer to FIG. 2. FIG. 2 is a schematic flowchart of a social interaction method according to an example of the present subject matter. The method may be performed by a computer device. The method includes the following steps:

S201: Display a social service page.

The social service page displays a first real scene room, and the first real scene room corresponds to a first virtual social scene. The first virtual social scene includes but is not limited to: a group social session scene, a game competition scene, a social operation activity scene, and the like. The first virtual social scene may contain one or more virtual images for social interaction, where the virtual images are respectively used to represent a social object engaging in social interaction in the first virtual social scene. It may be understood that whether the first virtual social scene contains virtual images and a quantity of the contained virtual images depend on needs of the scene or an actual situation of the scene. For example, if the first virtual social scene is a group social session scene, the first virtual social scene may contain virtual images corresponding to some or all social objects in a group, merely virtual images corresponding to online social objects in a group, or merely virtual images corresponding to social objects in a group that have sent social sessions within a preset time period.

Each social object may create a real scene room. The real scene room is a virtual 3D room created by the social object, and other social objects or friend objects may enter the real scene room. After a plurality of social objects enters, the virtual room may be considered as a social group with 3D real scene characteristics. In the social group, the social objects may chat, watch videos, listen to music, play games, and the like together through virtual images.

The creator of the real scene room may also encrypt the room, and other social objects may enter the real scene room after inputting a correct password. The creator may also set the real scene room to be closed within a period of time, during which the real scene room becomes a private space. After other social objects perform some or all operations of entering the room (these operations may be predefined by the creator), the creator may receive a room joining reminder request of a new social object, the room joining reminder request including information such as an identifier of the newly joining social object. The creator may choose to accept the user to enter the room according to requirements. After the target social object who desires to join the closed real scene room has completed some or all of the operations, the creator may also automatically respond to the joining operation of the target social object and accept the target social object to enter the real scene room that is currently a private space.

Figure 3:
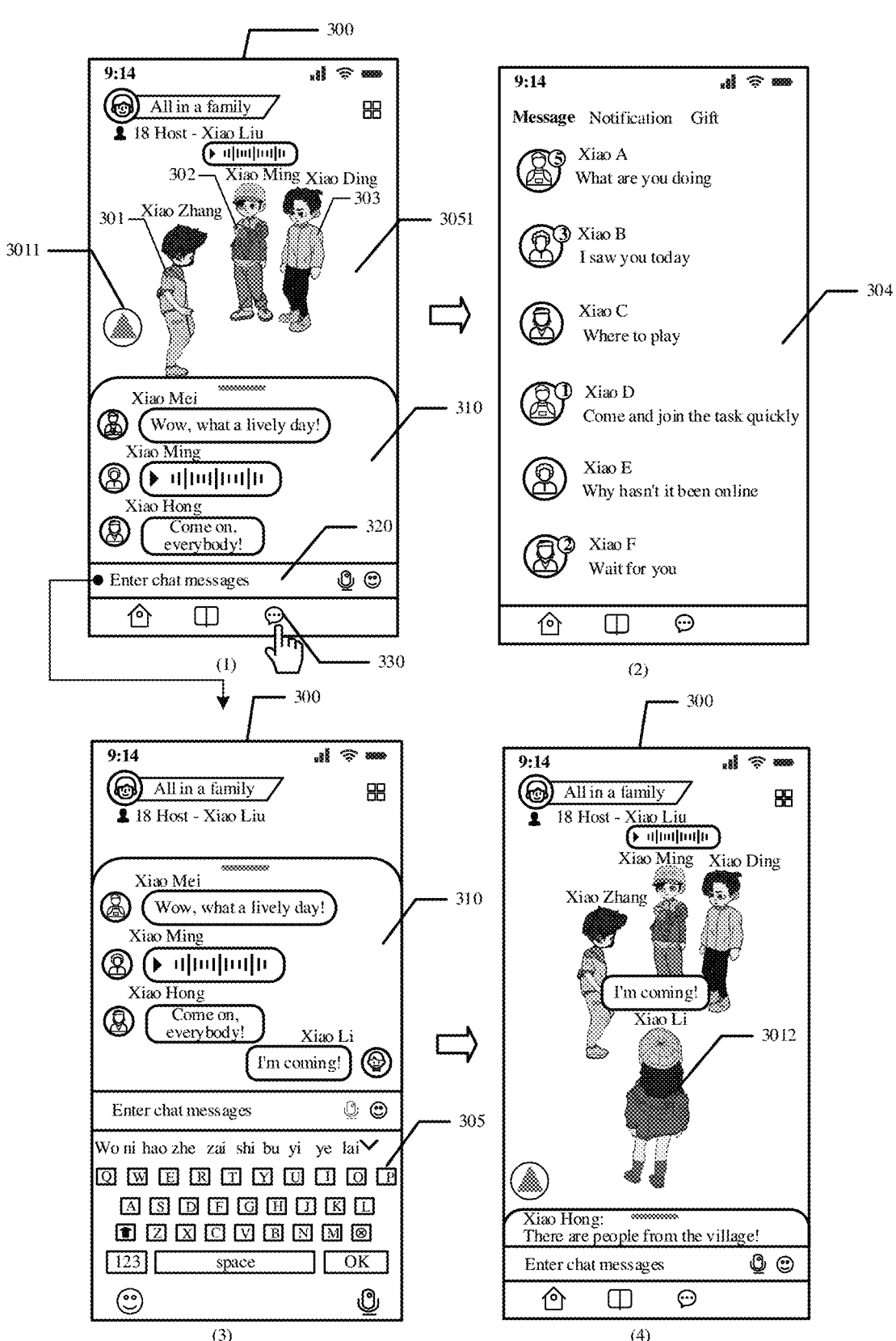
FIG. 3 is a schematic diagram of a social service page according to an example of the present subject matter.

Both the first real scene room and the virtual image may be displayed in 3D. Refer to FIG. 3, which is a schematic diagram of a social service page according to an example of the present subject matter. As shown in FIG. 3, the social service page 300 displays a first real scene room, the first real scene room displays a first virtual social scene, there are three virtual images (virtual image 301, virtual image 302, and virtual image 303) engaging in social interaction in the first virtual social scene, and the three virtual images represent three social objects.

In the example of the present subject matter, each real scene room may be presented in a form of information flow, and the target social object may browse each real scene room by sliding up and down (the operation is not limited to this, for example, sliding left and right when a display screen is large) a screen for the information flow. When the target social object browses the first real scene room by sliding the screen, the social service page displays a 3D scene in the first real scene room, existing virtual images, actions that the existing virtual images are performing or have performed, and the like. For example, the 3D scene (the first virtual social scene) presented in the first real scene room on the social service page includes: Two virtual images are watching television (TV) together while chatting, and one of the virtual images may perform a cleaning action simultaneously.

In the 3D scene of the first real scene room, the target social object may not only watch images and videos but also play audios during browsing, so that the target social object may hear sound. For example, in the foregoing first virtual social scene of watching TV, the two virtual images may represent social objects to watch TV, the TV may be presented in the first real scene room as a virtual TV prop, and the target social object can hear audio content played in the virtual TV prop. When hearing the content of interest, the target social object may stay and watch the played video content by touching the virtual TV prop. If the target social object desires to adjust a perspective or zoom in on the video content played in the virtual TV prop, the target social object may enter the first real scene room by touching the virtual TV prop or another virtual prop in the first real scene room, by touching a virtual image in the room, by inputting voice or text in a message input field of the first real scene room, or by adjusting a virtual control on the social service page to adjust a position and an orientation of a target virtual image corresponding to the target social object in the first real scene room.

That is, when the target social object browses the first real scene room, the target virtual image corresponding to the target social object will not be displayed in the first real scene room. Once the target social object initiates an interactive operation with the first real scene room or a virtual image or virtual prop in the first real scene room, the target social object enters the first real scene room, that is, the target virtual image corresponding to the target social object is displayed in the first real scene room.

Alternatively, in other examples, the target social object can experience merely some interactive effects in the first real scene room when browsing the 3D scene of the first real scene room. For example, the target social object can watch all/some images in the 3D scene of the first real scene room, watch all/some videos in the 3D scene of the first real scene room, or experience all interactive effects in the first real scene room after the target virtual image of the target social object enters the first real scene room.

S202: Display a target virtual image corresponding to a target social object in the first virtual social scene in response to receiving an interactive operation on the first virtual social scene.

The target social object is an object controlled by a terminal, that is, the target social object is an object controlled by a terminal that displays the social service page.

When the target social object actively triggers the interactive operation on the first virtual social scene, it indicates that the target social object is interested in the first virtual social scene and desires to join the first virtual social scene for social interaction. Then, the target virtual image corresponding to the target social object is displayed in the first real scene room.

In some examples, if the target social object does not trigger any interactive operation on the first virtual social scene, the target social object acts as a bystander, views session messages input by multiple parties, and may view a social session flow 310 as shown in FIG. 3. At the same time, the target social object may also view virtual images of one or more social objects displayed in a page area 3051.

In one implementation, the interactive operation of the target social object for the first virtual social scene may be an operation of controlling a virtual control. In this implementation, the virtual control is displayed in the first real scene room, and the target virtual image corresponding to the target social object is displayed in the first virtual social scene in response to receiving a trigger operation on the virtual control in the first real scene room. For example, as shown in FIG. 3, a virtual control 3011 is displayed in the first real scene room. The virtual control 3011 may be displayed at any position in the first real scene room or at any position on the social service page. A display form of the virtual control 3011 may be various, and is not limited here. The virtual image is controlled to move in the room by controlling the virtual control 3011. It may be understood that the movement in the room refers to virtual movement of the virtual image on the page or in the first virtual social scene. Optionally, a direction and speed of movement of the virtual image, movement to a specified position in the first virtual social scene, and the like may be controlled. When the virtual control 3011 is triggered by the target social object, the computer device receives the interactive operation of the target social object for the first virtual social scene, thereby displaying the target virtual image corresponding to the target social object in the first real scene room. The trigger operation for the virtual control may be, for example, a long press operation for the virtual control. If the long press operation received on the virtual control lasts for a longer time, the moving distance of the target virtual image after entering the first real scene room is longer.

After the target virtual image is displayed in the first virtual social scene, the target social object may control the virtual image to move to a specified position by triggering the virtual control. Optionally, the movement of the target virtual image in the first real scene room may be displayed as walking or running by default. It may be understood that the present subject matter does not limit the movement of the target virtual image in the first real scene room. It may be understood that the movement of the virtual image may alternatively be controlled through other operations, such as some gesture operations and voice operations. In an example, the purpose of controlling the movement of the virtual image may also be achieved through sliding operations of a joystick control in multiple directions, for example, an azimuth and an orientation of the virtual image are controlled by rotating on the joystick control, the corresponding virtual image is controlled to move continuously in left, right, upper, and lower directions by sliding left, right, up, and down, and the movement stops when touch on the joystick control is released.

In another implementation, the interactive operation of the target social object for the first virtual social scene may be an operation of sending a social session message for the first virtual social scene. When the target social object sends the social session message for the first virtual social scene, the computer device receives the interactive operation of the target social object for the first virtual social scene, thereby displaying the target virtual image corresponding to the target social object in the first real scene room.

The social service page may display a social session flow of the first virtual social scene, and the social session flow may contain one or more social session messages generated by a plurality of virtual images engage in social interactions. Optionally, the social session flow includes social session messages generated by social objects in the first virtual social scene. The social session message may be any or more of text, an expression, voice, a video, an image, a link, and the like. Correspondingly, the social service page may include a message input field, the message input field is used to input the social session messages, and the social session messages may be displayed in the social session flow when being sent. Optionally, a social session message may also be displayed on the periphery of the virtual image corresponding to the social object sending the social session message, that is, when the social session message sent by the target social object in the first virtual social scene is received, the social session message is displayed on the periphery of the target virtual image in the first real scene room. The periphery of the target virtual image may, for example, indicate that the distance between the area displaying the social session message and the area where the target virtual image is located is within a preset distance range. The distance between the area displaying the social session message and the area where the target virtual image is located may refer to the distance between center points of the two regions, the distance between closest edges of the two areas, or the like.

As shown in FIG. 3, the social service page 300 includes a social session flow 310 and a message input field 320. The target social object may input a social session message in the message input field 320. When the input social session message is sent, the target virtual image corresponding to the target social object is displayed in the first real scene room. In addition, the social session message is displayed in the social session flow 310. In one implementation, the social session message sent by the target social object may alternatively be displayed at a preset position on the periphery of the target virtual image corresponding to the target social object. As shown in FIG. 3, the social session message (the social message is "I'm coming") sent by the target social object (such as Xiao Li) and displayed in the social session flow 310 is synchronously displayed on the periphery of the target virtual image 3012 corresponding to Xiao Li in the first virtual social scene (a text box with content "I'm coming" is displayed above the target virtual image 3012).

In an example, when the target social object inputs a social session message, a keyboard operation panel may also be displayed on the social service page, and the target social object may edit the social session message such as text, an expression, or voice through the keyboard operation panel. Optionally, the keyboard operation panel may be unfolded or folded for display. When the keyboard operation panel is unfolded for display, the target social object may edit a social session message conveniently. When the keyboard operation panel is folded for display, the area of the first virtual social scene that may be displayed is larger to facilitate social interaction of the target social object in the first virtual social scene. As shown in FIG. 3, when the target social object inputs a social session message, a keyboard operation panel 305 shown in FIG. 3(3) may also be displayed on the social service page 30, and the target social object may edit the social session message such as text, an expression, or voice through the keyboard operation panel 305. Optionally, the keyboard operation panel 305 may be unfolded or folded for display. FIG. 3(4) shows a schematic diagram of folded display of the keyboard operation panel. In an example, the social service page may alternatively include a message navigation identifier, a session message list may be displayed when the message navigation identifier is selected, and the session message list displays social session messages sent by other social objects to the target social object. As shown in FIG. 3, the social service page 300 alternatively includes a message navigation identifier 330. When the message navigation identifier 330 is selected, a session message list 304 shown in FIG. 3(2) may be entered.

If the social session message sent by the target social object contains target interactive content, the target virtual image may be controlled to perform a group of object actions corresponding to the target interactive content. The target interactive content may be either a piece of preset interactive content or a specified type of interactive content. In an example, the preset interactive content refers to a preset instruction mark, or content contained in a preset semantic corpus. Specifically, the instruction mark is a symbol or command word set by the target social object to simplify instruction content. For example, the target social object may set the instruction mark "%" to indicate an instruction "jump in place". If the target social object sends a social session message "%", the instruction "jump in place" may be recognized, and then the target virtual image is controlled to perform an object action "jump in place". The preset semantic corpus contains dynamics or expressions of virtual images corresponding to semantics. If the social session message sent by the target social object hits the semantic corpus, the target virtual image may be controlled to perform a corresponding object action. For example, if the target social object sends a social session message "kiss", which is the content contained in the preset semantic corpus, the target virtual image may be controlled to perform a kiss action. Further, if the social session message sent by the current target social object and the social session messages sent by other social objects hit the same content in the preset semantic corpus, the virtual images corresponding to the plurality of social objects that send the social session messages may jointly trigger a corresponding object action. For example, four social objects send "cheer", the virtual images corresponding to the four social objects may be controlled to jointly perform an object action corresponding to cheer dynamics. This method enables the social interaction of the target virtual image in the first real scene room to be richer, and is conducive to improving enthusiasm of the social objects to participate in the interaction.

Figure 4:
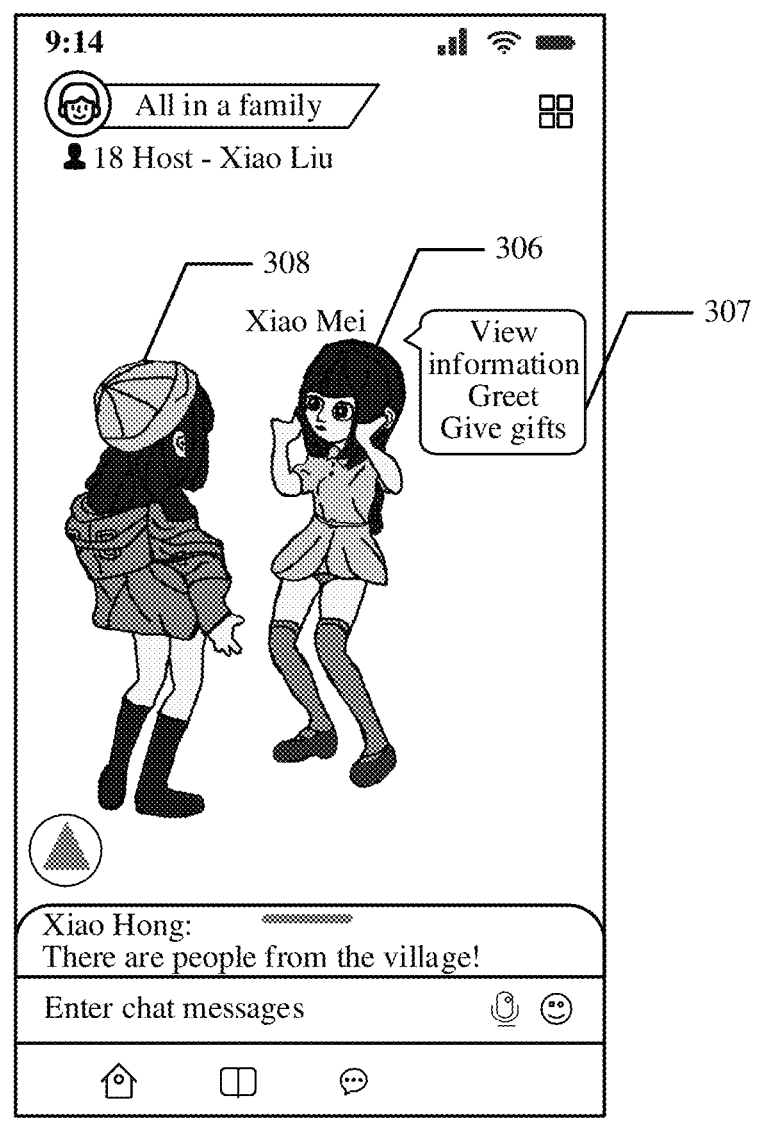
FIG. 4 is a schematic flowchart of determining whether a social session message contains target interaction content according to an example of the present subject matter.

In another implementation, the first virtual social scene already includes M virtual images for social interaction. The interactive operation received for the first virtual social scene may be an interactive operation initiated for a reference virtual image among the M virtual images in the first virtual social scene. The reference virtual image may be any of the M virtual images, or may be a special virtual image. For example, the reference virtual image may be a virtual image corresponding to the social object that creates the first real scene room. After the interactive operation initiated for the reference virtual image is generated, the target virtual image corresponding to the target social object is displayed in the first real scene room in response to the interactive operation initiated by the target social object for the reference virtual image among the M virtual images. When the target social object initiates an interactive operation for any virtual image in the first virtual social scene, the computer device receives the interactive operation of the target social object for the first virtual social scene, and may display the target virtual image corresponding to the target social object in the first real scene room. The target virtual image may be a virtual image customized by the target social object. Optionally, when the target social object clicks any of the M virtual images in the first virtual social scene, an interactive panel may be triggered and displayed. The interactive panel may contain a plurality of interactive options, such as selecting actions or viewing information. When the target social object selects any of the interactive options, the target virtual image corresponding to the target social object may be displayed in the first real scene room. Refer to FIG. 4, which is a schematic diagram showing that a target social object initiates an interactive operation for a virtual image according to an example of the present subject matter. As shown in FIG. 4, an interactive panel 307 corresponding to a virtual image 306 is displayed on the social service page. The interactive panel 307 includes three interactive options: viewing information, greeting, and giving gifts. When the target social object selects the interactive option "Greet", the virtual image 306 performs an object action corresponding to "Greet". Because the target social object initiates the interactive operation for the virtual image 306, a virtual image 308 corresponding to the target social object is displayed in the first real scene room.

In another implementation, assuming that the first virtual social scene contains a virtual prop, the interactive operation of the target social object for the first virtual social scene may be a trigger operation on the virtual prop, that is, when the target social object performs a trigger operation on the virtual prop, the computer device receives the interactive operation of the target social object for the first virtual social scene, and the target virtual image corresponding to the target social object is displayed in the first real scene room. The trigger operation of the target social object on the virtual prop includes any of a click trigger operation, a voice trigger operation, and a gesture trigger operation. For example, the first virtual social scene includes a television as a virtual prop, and the target social object clicks the television to initiate an interactive operation on the first virtual social scene.

In an example, virtual props in the first virtual social scene may be classified according to interactive attributes. Here, the virtual props refer to virtual items having specific interactive capabilities in a real scene room, and each virtual prop has its interactive attribute. In a specific implementation, the virtual props in the first virtual social scene may be a first type of virtual props, and interactive attributes of the first type of virtual props may be used to indicate scene form change information of the first virtual social scene. If the first type of virtual props is triggered, a scene form of the first virtual social scene will be updated according to the interactive attributes of the first type of virtual props. The scene form change information includes but is not limited to changes in video playback ratio, audio volume, light display, and the like. For example, the first type of virtual props may be a virtual TV prop in the first virtual social scene, and if the virtual TV prop is triggered, full-screen video playback may be triggered in the first virtual social scene. For another example, the first type of virtual props may alternatively be a virtual audio prop in the first virtual social scene, and if the virtual audio prop is triggered, audio volume may be adjusted in the first virtual social scene. For another example, the first type of virtual props may alternatively be a virtual lamp prop in the first virtual social scene, and if the virtual lamp prop is triggered, a light source may be turned on or off in the first virtual social scene. Moreover, the virtual props in the first virtual social scene may alternatively be a second type of virtual props, and interactive attributes of the second type of virtual props may be used to indicate object actions that one or more virtual images in the first virtual social scene are to perform. If the second type of virtual props is triggered, the one or more virtual images in the first virtual social scene may be controlled to perform corresponding object actions according to the interactive attributes of the second type of virtual props. For example, the second type of virtual props may be a virtual seesaw prop in the first virtual social scene, and the virtual seesaw prop needs to be triggered by two virtual images together. After any two virtual images are specified to trigger the virtual seesaw prop in the first virtual social scene, the two specified virtual images may be controlled to perform an object action of playing a virtual seesaw. Optionally, the virtual props in the first virtual social scene may alternatively be a third type of virtual props, and interactive attributes of the third type of virtual props are used to indicate feedback operations supported for the triggered virtual props. The third type of virtual props may refer to props that are not bound with interactive functions or are of specific object actions. When this type of virtual props is triggered, details of the virtual props may be viewed, or the virtual props may be collected or purchased, or the virtual props may be liked and commented. Correspondingly, an owner of this type of props may receive a feedback message about a corresponding operation. For example, the owner of this type of props may be the creator of the first real scene room.

In an example, in response to receiving an interactive operation on the first virtual social scene, a display attribute of the target virtual image may be obtained first. The display attribute of the target virtual image may be either a hidden attribute or an explicit attribute. If the display attribute of the target virtual image is a hidden attribute, the target virtual image may be displayed in a transparent state in the first real scene room, If the display attribute of the target virtual image is an explicit attribute, the target virtual image may be displayed in a non-transparent state in the first real scene room. The display attribute of the target virtual image may be set by the target social object, and a setting parameter for the display attribute may be configured with display duration. If the display duration corresponding to the current set display attribute of the target virtual image reaches a preset threshold, the display attribute may be switched to another display attribute. For example, if the current set display attribute of the target virtual image is a hidden attribute and the corresponding display duration is 1 minute, the display attribute of the target virtual image may be switched from the hidden attribute to an explicit attribute after 1 minute, that is, the target virtual image may be switched from transparent display state to the non-transparent display state in the first real scene room. In one possible implementation, the display attribute of the target virtual image may be bound with a virtual prop, for example, the hidden attribute is bound with a virtual hidden prop. If the target virtual image carries a virtual hidden prop, that is, the corresponding display attribute is a hidden attribute, the target virtual image is displayed in a transparent state in the first real scene room. If the target virtual image does not carry the virtual hidden prop, the target virtual image is displayed in an explicit state by default in the first real scene room.

By implementing the examples of the present subject matter, a first real scene room which displays a first virtual social scene may be displayed on a social service page, and a target virtual image corresponding to a target social object may be displayed in the first real scene room in response to an interactive operation of the target social object for the first virtual social scene. In this case, the target social object may enter the first real scene room through the target virtual image to participate in social interaction, so that the target social object has more intuitive visual feedback, immersion of the target social object is enhanced, and reality and fun of the social interaction are increased.

According to the method provided in this example, a social session flow is displayed on the social service page to display social session messages generated by social objects in the first virtual social scene, without triggering other viewing operations to view the social session flow, thereby improving human-machine interaction efficiency.

According to the method provided in this example, the target virtual image is triggered through a virtual control to enter the first virtual social scene, and the target virtual image is directly controlled to enter the first virtual social scene when the target virtual image interacts with the first real scene room, thereby improving social interaction efficiency.

According to the method provided in this example, when the target social object initiates an interactive operation with the social objects in the first real scene room, the target virtual image is controlled to enter the first virtual social scene, thereby avoiding additional operations to control the target virtual image to enter the first virtual social scene, and improving social interaction efficiency.

According to the method provided in this example, when a trigger operation for a virtual prop in the first virtual social scene is received, the target virtual image is controlled to enter the first virtual social scene, thereby avoiding additional operations to control the target virtual image to enter the first virtual social scene, and improving social interaction efficiency.

According to the method provided in this example, when the target social object sends a social session message in the first virtual social scene, the target virtual image is controlled to enter the first virtual social scene, thereby improving diversity of interaction between the target social object and the first real scene room and improving human-machine interaction efficiency of social interaction.

According to the method provided in this example, when the target virtual image enters the first virtual social scene by sending the social session message, the social session message is displayed on the periphery of the target virtual image, and other virtual images in the first virtual social scene are enabled to quickly obtain the social message sent by the target social object, thereby improving effectiveness and efficiency of information transmission.

Figure 5:
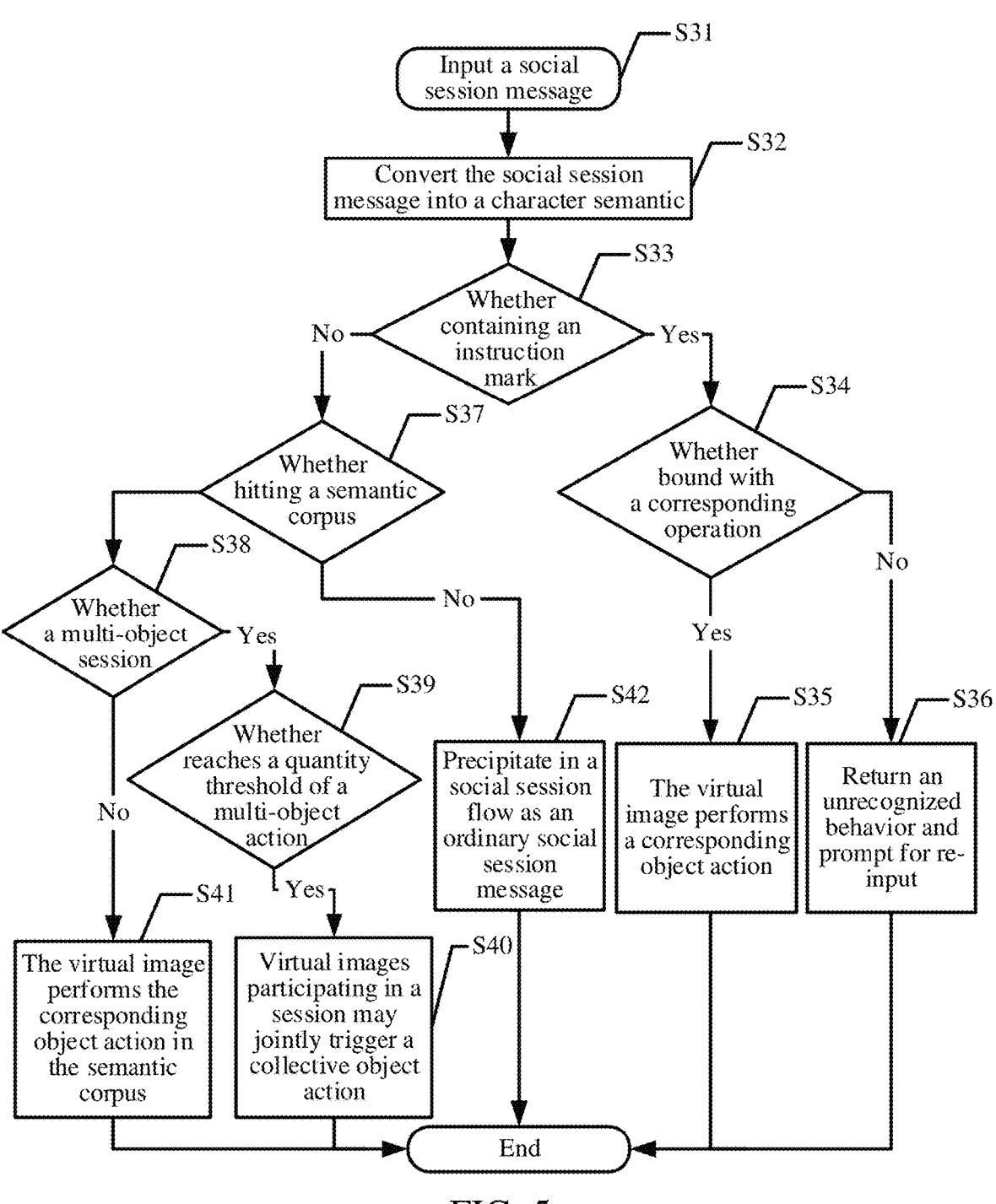
FIG. 5 is a schematic diagram showing that a target social object initiates an interactive operation to a virtual image according to an example of the present subject matter.

In an example, when the target social object sends the social session message for the first virtual social scene, determining whether the social session message contains target interactive content (the target interactive content may be preset interactive content) may be implemented through the steps shown in FIG. 5.

S31: Input a social session message.

The target social object may input the social session message on the social service page. The input social session message may be a text message or a voice message, where the voice message may be real-time voice or recording.

S32: Convert the social session message into a character semantic.

The social session message input by the target social object is converted into the character semantic. Here, other social session messages that appear in the social session flow may also be converted simultaneously. After the user inputs real-time voice, recording, or text messages, the social session messages will be uniformly converted into character semantics. The social session message is subsequently determined by determining the character semantic. For example, whether the social session message contains an instruction mark is determined by determining whether the character semantic contains the instruction mark, whether the social session message hits a semantic corpus is determined by determining whether the character semantic hits the semantic corpus, or whether the social session message is a multi-object session is determined by determining whether the character semantic is the multi-object session. The social session message may alternatively be directly determined without being converted into the corresponding character semantic. For example, whether a voice type of social session message contains an instruction mark, hits a semantic corpus, is a multi-object session, or the like may be determined by voice recognition.

S33: Determine whether the social session message contains an instruction mark.

The instruction mark is a symbol or command word set by the target social object to simplify instruction content. Content of the social session message input by the target social object may contain a preset instruction mark. S34 below is performed when the determination result in S33 is positive, and S37 below is performed when the determination result in S33 is negative.

S34: Determine whether a corresponding operation is bound in a prop library.

The prop library may contain mapping relationships between instruction marks and object actions. If the social session message input by the target social object contains an instruction mark, it may be further determined whether an object operation corresponding to the instruction mark is bound in the prop library. S35 below is performed when the determination result in S34 is positive, and S36 below is performed when the determination result in S34 is negative.

S35: The virtual image performs a corresponding object action.

If the instruction mark contained in the social session message is bound with the corresponding object action in the prop library, the target virtual image may perform the corresponding object action.

S36: Return an unrecognized behavior and prompt for re-input.

If the corresponding object action is not found in the prop library for the instruction mark contained in the social session message, prompt information may be returned to prompt that the target social object did not recognize the object action corresponding to the instruction mark, so as to guide the target social object for re-input.

S37: Determine whether the social session message hits a semantic corpus.

If any instruction mark cannot be recognized from the character semantic obtained by conversion, the social session message is processed to determine whether the character semantic hits a social behavior semantic corpus, that is, whether there is a virtual character dynamic or expression corresponding to the semantic in the semantic corpus. The semantic corpus may contain object actions corresponding to semantics. The object actions may be, for example, virtual image dynamics or expressions. If the social session message does not contain any instruction mark, whether the social session message hits the semantic corpus may be determined. Optionally, the step of determining whether the social session message hits a semantic corpus may be performed in reverse order of the step of determining whether the social session message contains an instruction mark. That is, whether the social session message hits a semantic corpus may be first determined, and then whether the social session message contains an instruction mark may be determined. S38 below is performed when the determination result in S37 is positive, and S42 below is performed when the determination result in S37 is negative.

S38: Determine whether the social session message is a multi-object session message.

If the social session message hits the semantic corpus, whether the session message is a multi-object session message may be determined. A multi-object session refers to an associated session message generated by communication of a plurality of social objects. For example, social session messages with same content that are input by the plurality of social objects may be determined as the multi-object session, and session messages, generated by the plurality of social objects, about replies to social session messages with same topic content may also be determined as the multi-object session. S39 below is performed when the determination result in S38 is positive, and S41 below is performed when the determination result in S38 is negative.

S39: Determine whether the social session message reaches a quantity threshold of a multi-object action.

If the social session message is determined as the multi-object session message, whether a quantity of social objects that send the multi-object session message has reached the threshold may be successively determined. S40 below is performed when the determination result in S39 is positive, and the object actions are processed normally when the determination result in S39 is negative. For example, when the determination result in S39 is negative, S41 is performed, or the object actions are not performed.

S40: Virtual images participating in a session may jointly trigger a collective object action.

If the quantity of social objects participating in the multi-object session reaches the quantity threshold, the virtual images corresponding to the social objects participating in the multi-object session may jointly trigger the collective object action. For example, if more than four social objects send "ha ha", the virtual images corresponding to the social objects participating in the multi-object session may jointly trigger the corresponding object action "ha ha" in the semantic corpus.

S41: The virtual image performs the corresponding object action in the semantic corpus.

If the social session message hits the semantic corpus and the social session message is not a multi-object session message, the target virtual image may be directly controlled to perform the corresponding object action in the semantic.

S42: Precipitate the social session message in a social session flow as an ordinary social session message.

If the social session message does not hit the semantic corpus, the social session message is displayed in the social session flow, and the target virtual image will not perform the object action.

In this way, the content of the social session message may be displayed through the object action of the target virtual image, which not only enriches the presentation result of the social session message but also enriches the display effect of the virtual image.

According to the method provided in this example, when a session message sent by the target social object hits a keyword in the semantic corpus, the target virtual image is controlled to perform a corresponding object action, thereby expressing the semantic of the session message sent by the target social object more intuitively, and improving information transmission efficiency and effectiveness.

According to the method provided in this example, when session messages sent by a plurality of social objects hit a keyword in the semantic corpus, a plurality of target virtual images are controlled to trigger a collective object action, thereby improving social diversity.

Figure 6:
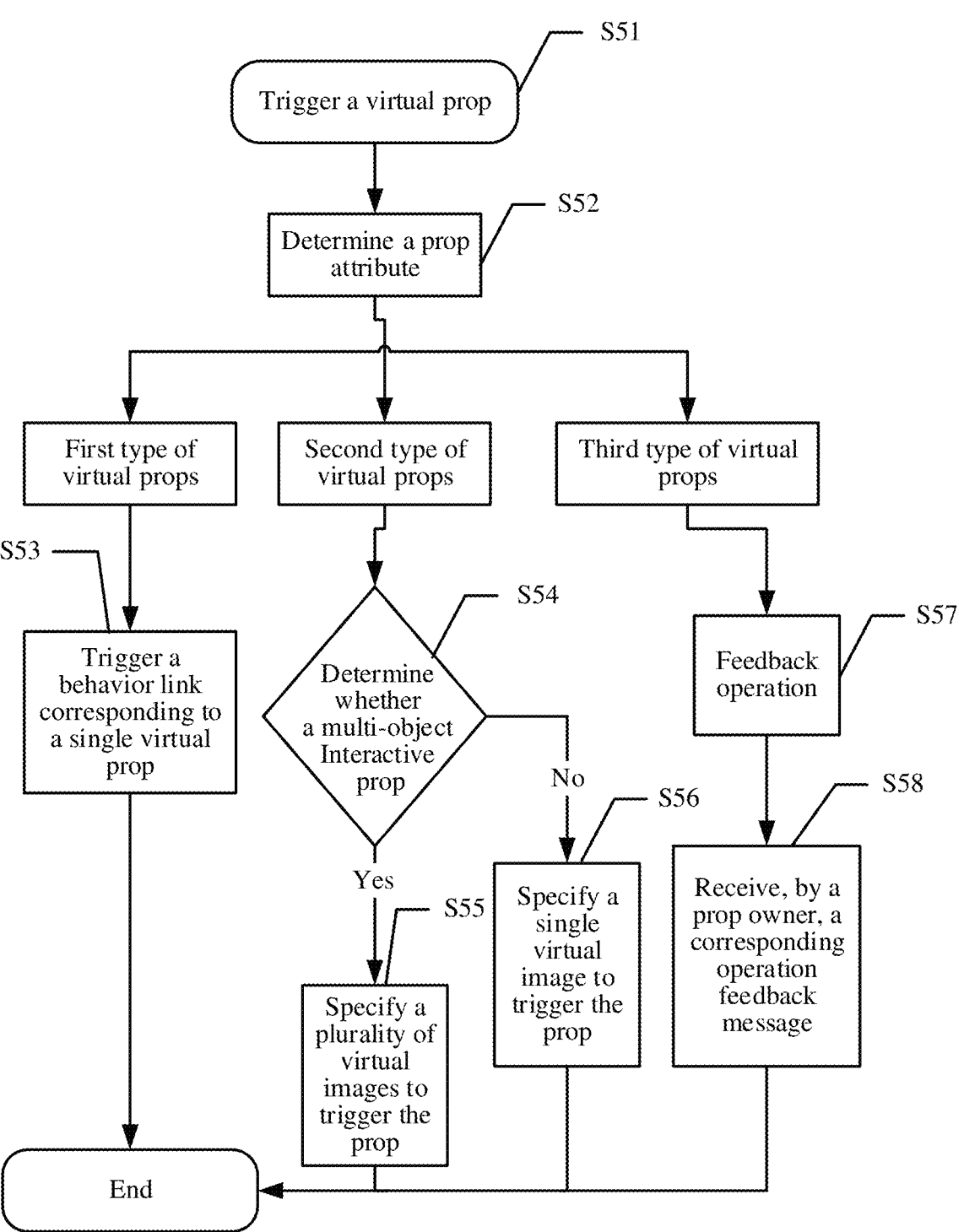
FIG. 6 is a schematic flowchart of determining a prop attribute of a virtual prop according to an example of the present subject matter.

In an example, when a virtual prop in the first virtual social scene is triggered, a prop attribute of the virtual prop and interactive content correspondingly triggered by the prop attribute may be determined through the steps shown in FIG. 6.

S51: Trigger a virtual prop.

Optionally, the target social object triggers the virtual prop by clicking the virtual prop.

S52: Determine a prop attribute.

Because the virtual prop may have different prop attributes, when the virtual prop is triggered, the computer device needs to determine the attribute of the virtual prop, so as to trigger an operation entry and link corresponding to the virtual prop.

S53: Trigger a behavior link corresponding to a single virtual prop if the triggered virtual prop is the first type of virtual props.

Optionally, the first type of virtual props is a scene interactive prop. After the first type of virtual props is triggered, the scene form change information of the virtual social scene may be changed. The first type of virtual props may be bound with a specific interactive behavior. Clicking the first type of virtual props may trigger a corresponding behavior link to change the scene form change information of the virtual social scene.

S54: Determine whether the triggered virtual prop is a multi-object interactive prop if the virtual prop is the second type of virtual props.

Optionally, the second type of virtual props refers to props that can be triggered by intervention of virtual images, and may be classified into single-object interactive props and multi-object interactive props. By triggering the second type of virtual props, one or more virtual images in the virtual social scene may be controlled to perform corresponding object actions. S55 is performed when the determination result in S54 is a multi-object interactive prop, and S56 below is performed when the determination result in S54 is not a multi-object interactive prop but a single-object interactive prop.

S55: Specify a plurality of virtual images to trigger the prop.

The plurality of virtual images may be specified to trigger the virtual prop which is a multi-object interactive prop in the second type of virtual props.

S56: Specify a single virtual image to trigger the prop.

If the virtual prop is a single-object interactive prop in the second type of virtual props, any virtual image in the virtual social scene may be specified to trigger the prop.

S57: Display a feedback operation option supported by the third type of virtual props if the virtual prop is the third type of virtual props.

The third type of virtual props may refer to props that are not bound with specific interactive behaviors. The third type of virtual props is triggered to display feedback operation options supported by the third type of virtual props. The feedback operation options may be, for example, operation options of viewing introduction (or details), liking, and commenting. An owner of the third type of virtual props may receive corresponding operation message feedback, and an object model and a rendering effect of the third type of virtual props may be changed or may not be affected in any way.

S58: Trigger a feedback operation supported by the third type of virtual props, and receive, by a prop owner, a corresponding operation feedback message.

For example, if the third type of virtual props is liked or commented, the prop owner will receive a feedback message about the corresponding operation.

In this way, an original operation entry of a page control is made in a form of a virtual prop, thereby further enhancing interactivity of the virtual social scene and increasing experience reality of the target social object.

According to the method provided in this example, for different attributes of virtual props, when the virtual props are triggered, social interactions corresponding to interactive attributes are displayed, thereby increasing diversity of the social interactions.

According to the method provided in this example, for a first type of virtual props, when the first type of virtual props is triggered, a scene form change of the first virtual social scene is displayed, thereby increasing interactivity between target virtual characters and virtual social scenes.

According to the method provided in this example, for a second type of virtual props, when the second type of virtual props is triggered, a process of performing an object action by one or more virtual images is displayed, thereby increasing diversity of interactions between virtual objects and virtual social scene.

According to the method provided in this example, for a third type of virtual props, when the third type of virtual props is triggered, a feedback action of the target virtual image on the triggered third type of virtual props is displayed, thereby increasing diversity of interactions between virtual images and virtual props in virtual social scenes.

Figure 7:
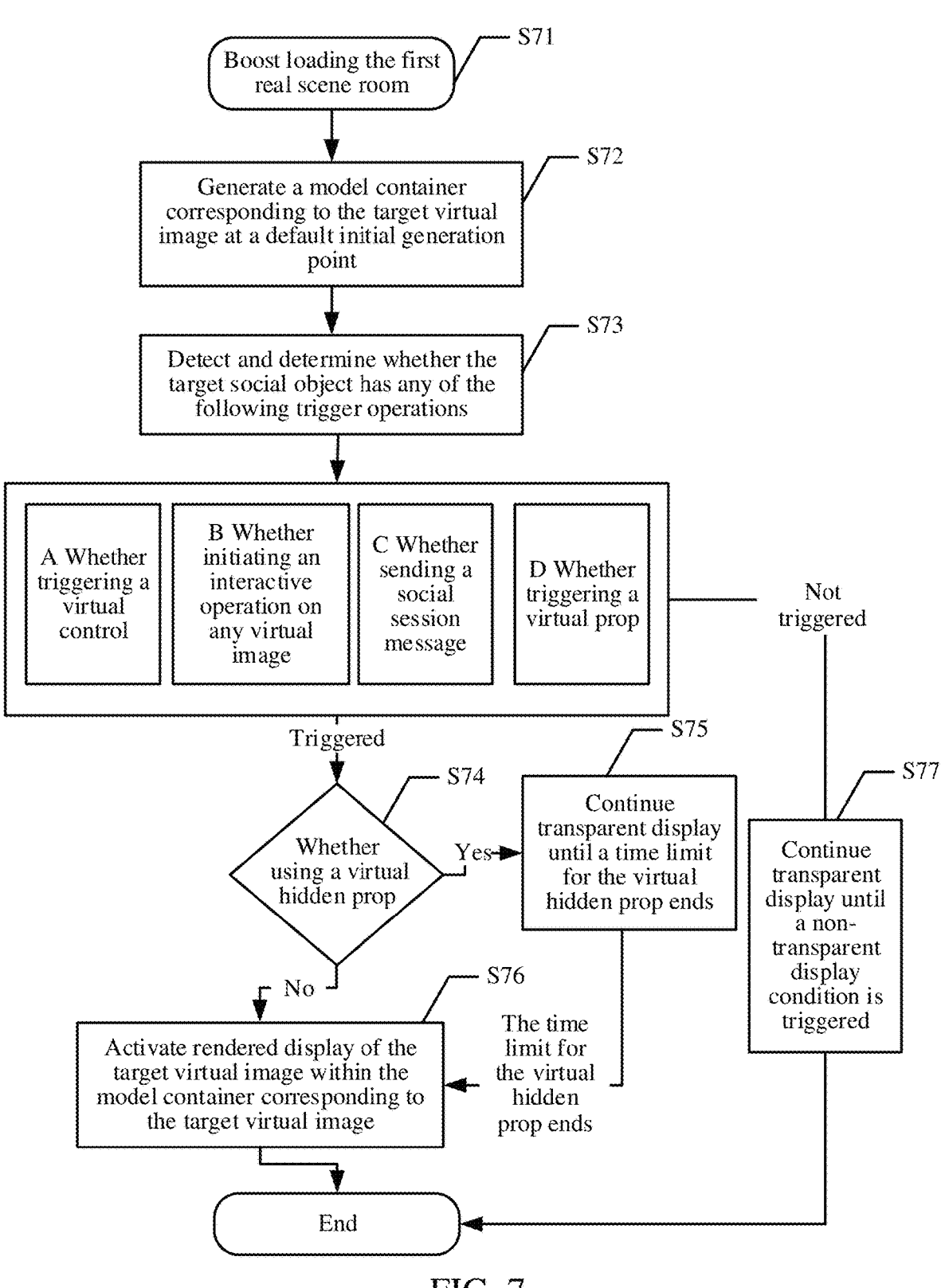
FIG. 7 is a schematic flowchart of displaying a target virtual image according to an example of the present subject matter.

In an example, displaying a target virtual image corresponding to a target social object in the first real scene room may be implemented through the steps shown in FIG. 7.

S71: Boost loading the first real scene room.

S72: Generate a model container corresponding to the target virtual image at a default initial generation point.

The computer device may generate the model container corresponding to the target virtual image at the default initial point in the first real scene room. For example, Meshbox may be used as the container for the virtual image. Meshbox is a container for placing a model in a 3D engineering scene. In this case, the target virtual image may not be rendered or exposed, and only a position of the container may be retained, that is, the target virtual image is displayed transparently. When a plurality of virtual images enters the first real scene room, model containers corresponding to the virtual images may be generated at the same default initial generation point.

S73: Detect and determine whether the target social object has any of the following trigger operations:

(1) Whether triggering a virtual control. The virtual control may be displayed in the first real scene room. The virtual control may be used to control movement of the virtual image in the room. If the computer device detects that the target social object triggers the virtual control, it may be considered that the target social object actively triggers display of the target virtual image in the first real scene room.

(2) Whether initiating an interactive operation on any virtual image. The target social object may initiate the interactive operation on any virtual image by clicking the corresponding virtual image, or by triggering an object action on the virtual image, for example, selecting the virtual image to greet or give gifts. If the computer device detects that the target social object initiates the interactive operation on any virtual image, it may be considered that the target social object actively triggers display of the target virtual image in the first real scene room.

(3) Whether sending a social session message. The social service page may include a message input field, and the target social object edits and sends the social session message in the message input field. If the computer device detects that the target social object sends the social session message, it may be considered that the target social object actively triggers display of the target virtual image in the first real scene room.

(4) Whether triggering a virtual prop. The first virtual social scene may contain many types of virtual props. The target social object may trigger the virtual prop by clicking the virtual prop. If the computer device detects that the target social object triggers the virtual prop, it may be considered that the target social object actively triggers display of the target virtual image in the first real scene room.

S74 below is performed if any of the operations is triggered, otherwise S77 below is performed.

S74: Determine whether the social object uses a virtual hidden prop.

If any of the foregoing trigger operations of the target social object is detected out, whether the social object uses a virtual hidden prop is further determined.

The virtual hidden prop may enable the target virtual image corresponding to the target social object to be continuously transparently displayed, so as to meet a demand that the target social object does not desire to expose its virtual image. S75 below is performed when the determination result in S74 is positive, otherwise S76 below is performed.

S75: Continue transparent display until a time limit for the virtual hidden prop ends.

The virtual hidden prop may be set with a corresponding time parameter. When a preset time arrives, it may be considered that the virtual hidden prop fails.

S76: Activate rendered display of the target virtual image within the model container corresponding to the target virtual image.

If any of the foregoing trigger operations of the target social object is detected out and any virtual hidden prop is not used or the virtual hidden prop fails, the rendered display of the target virtual image may be activated within the model container corresponding to the target virtual image, that is, the target virtual image may be displayed in a non-transparent state.

S77: Continue transparent display until a non-transparent display condition is triggered.

If any of the foregoing trigger operations of the target social object is not detected out, the target virtual image is continuously transparently displayed, which may ensure that object information of the target social object is effectively protected.

Figure 8:
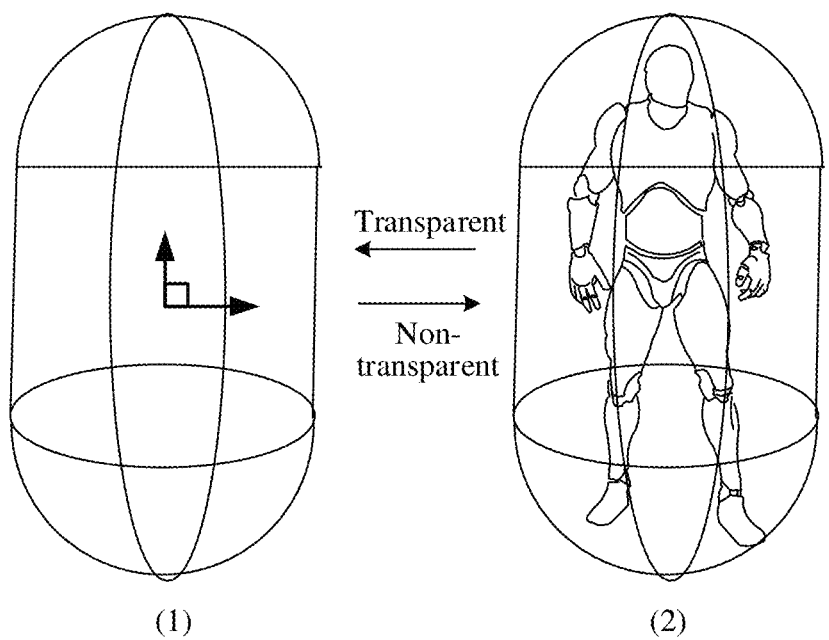
FIG. 8 is a schematic diagram of a display state of a target virtual image according to an example of the present subject matter.

Refer to FIG. 8, which is a schematic diagram of transparent display and non-transparent display of the target virtual image according to an example of the present subject matter, where FIG. 8(1) is a schematic diagram of transparent display of the target virtual image, and FIG. 8(2) is a schematic diagram of non-transparent display of the target virtual image.

In an example, the target virtual image may be displayed in the first real scene room based on a default virtual perspective. When a virtual perspective of the target virtual image in the first real scene room changes, the scene content of the virtual social scene in the first real scene room may be updated according to the change in the virtual perspective. The change in the virtual perspective includes any of the following cases:

(1) A focal length of the virtual perspective changes. Here, the change in the focal length of the virtual perspective may be caused by a focal length adjustment operation of the target social object corresponding to the target virtual image. For example, the social target social object may perform a gesture zoom operation on the social service page displaying the first virtual social scene, to adjust the focal length of the virtual perspective. Following the zoom operation, page content will be zoomed in or out. The focal length adjustment operation on the virtual perspective may be the gesture zoom operation, or a trigger operation on a focal length adjustment control, which is not limited here.

(2) An angle of the virtual perspective changes. The change in the angle of the virtual perspective may be caused after the virtual image is controlled to rotate within an angle range. For example, the social service page may include an angle adjustment control. By triggering the angle adjustment control, the virtual image may be controlled to rotate for 360 degrees. Correspondingly, the scene content in the virtual scene may also be updated for display according to the change in the rotation of the virtual image.

(3) A position of the target virtual image changes. When the virtual image moves in the first virtual scene, the scene content of the virtual social scene in the first real scene room may also be updated for display following the moving position of the virtual image. For example, when the target virtual image moves to an activity area, the corresponding scene content of the virtual social scene in the activity area may be updated for display.

In an example, the first real scene room may be a theme customized room. The theme may be, for example, a music theme, a game theme, or a sports theme. When the target virtual image corresponding to the target social object is displayed in the first real scene room, an option related to a customized theme may be output. For example, an option for selecting a played song may be output for the music theme, an option for selecting a game role may be output for the game theme, or an option for selecting a sports team may be output for the sports theme. The output option related to the customized theme may be displayed on the social service page. Different themes may have differences in background (including color, decoration, and the like), virtual prop layout, and the like. Further, in response to a selection operation on the option related to the customized theme, a display form of the target virtual image may further be updated to match the selected option. The display form of the target virtual image may refer to dressing of the target virtual image in the first virtual social scene. After the option related to the customized theme is triggered, the dressing of the target virtual image may be updated to match the theme. For example, the first real scene room is assumed to be a sports themed room. After the target virtual image is displayed in the first real scene room, an option for selecting a sports team may be output. When the target social object selects the sports team, the dressing of the target virtual image may be replaced with a team uniform corresponding to the selected sports team. In this way, the display form of the target virtual image is enriched and the experience of the target social object is improved.

Figure 9:
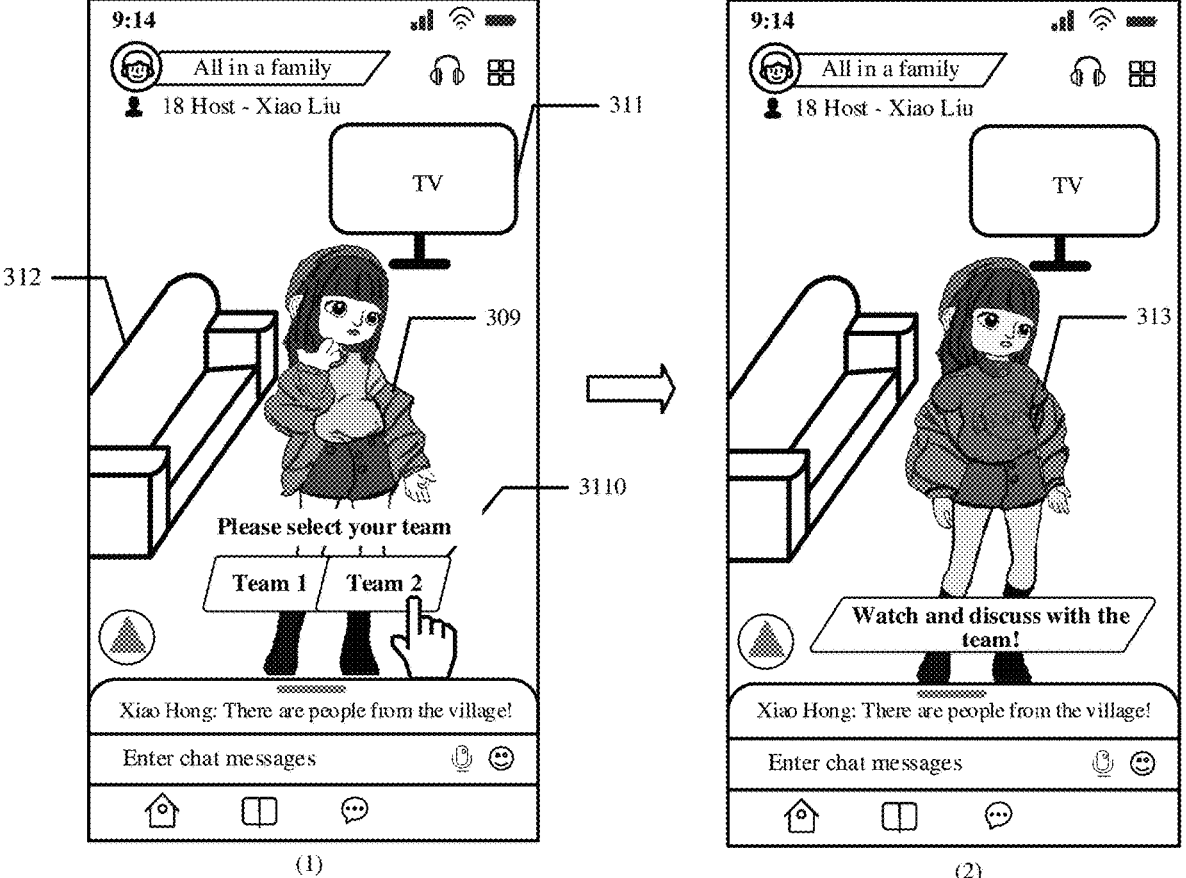
FIG. 9 is a schematic diagram of a theme customized room according to an example of the present subject matter.

Refer to FIG. 9, which is a schematic diagram of a theme customized room according to an example of the present subject matter. As shown in FIG. 9(1), the first real scene room may be a sports theme room. When a target virtual image 309 is displayed in the first real scene room, an option 3110 for selecting a sports team may be output. After the target social object selects the sports team, the dressing of the target virtual image may be replaced with a team uniform corresponding to the sports team. As shown in FIG. 9(2), the dressing of the target virtual image 313 is replaced the team uniform corresponding to the selected sports team. In addition, the first real scene room further includes a virtual TV prop 311 and a virtual sofa prop 312. In one possible implementation, the target social object triggers the virtual TV prop 311 to zoom in screen content on the virtual TV prop 311 for viewing, and enters a watching area in the first real scene room to watch TV and communicate with other virtual images, or the target social object triggers the virtual sofa prop to control the target virtual image to move to the virtual sofa prop to rest.

In an example, after the target virtual image corresponding to the target social object is displayed in the first real scene room, the target virtual image may be controlled to move. The first virtual social scene may include a social activity area. When the target virtual image moves into the social activity area, an activity page of a social activity may be displayed, and the target virtual image is enabled to join the social activity through the activity page. The activity page of the social activity may include an activity operation control corresponding to the social activity. By triggering the activity operation control, the target virtual image may be controlled to engage in the social activity on the activity page. For example, the social activity area may be a shooting area. When the target virtual image enters the shooting area, an activity page of the shooting area may be displayed. The activity page of the shooting area may include an activity operation control that controls the target virtual image to perform a shooting action. By triggering the activity operation control, the target virtual image may be controlled to shoot. Further, the social activity area may also display virtual images corresponding to other social objects participating in the social activity. The target social object may compete with the other social objects in the activity. This method may further enhance the fun of interaction between the social objects. The social activity area may be, for example, a watching area 401 in FIG. 10(1). When an interactive operation of a social object, such as clicking or a gesture, is received at the watching area 401, the social object enters an activity page 315 of the social activity.

In an example, the first virtual scene may further include an entry to the social activity, and the entry may be an activity link corresponding to the social activity page. When the entry to the social activity is triggered, the activity page of the social activity may also be displayed. Optionally, the entry to the social activity may be displayed in the social session flow of the first virtual scene or bound with a specific virtual prop. For example, assuming that the first virtual scene includes a virtual basketball prop, the entry corresponding to the shooting activity may be bound with the virtual basketball prop. By triggering the virtual basketball prop, the corresponding activity page of the shooting activity may be displayed.

Figure 10:
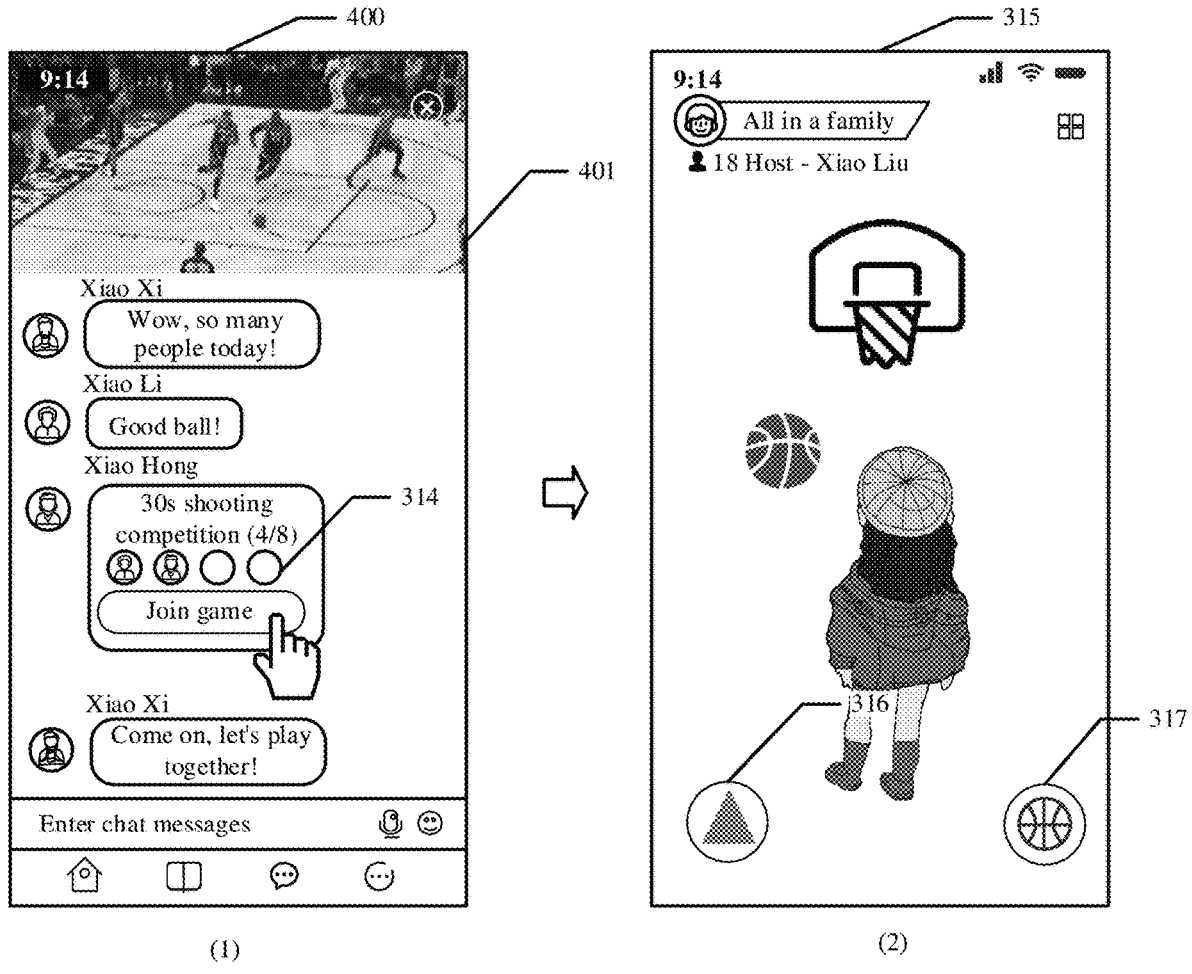
FIG. 10 is a schematic diagram of an activity page of a social activity according to an example of the present subject matter.

Refer to FIG. 10, which is a schematic diagram of an activity page of a social activity according to an example of the present subject matter. As shown in FIG. 10(1), the social service page 400 includes a watching area 401, content played in the watching area 401 may be screen content zoomed in and displayed in the virtual TV prop 311 after the virtual TV prop 311 shown in FIG. 9(1) is triggered, and the entry 314 of the social activity may be an activity link shared by other social objects in the social session flow. The activity page 315 of the social activity as shown in FIG. 10(2) may be displayed by triggering the entry 314 of the social activity. The activity page 315 of the social activity includes a virtual control 316 that controls the virtual image to move, and an activity operation control 317 that controls the virtual image to perform a shooting action. The activity page 315 of the social activity may alternatively be displayed after the target virtual image moves to the social activity area in the first real scene room.

By implementing the example of the present subject matter, on the one hand, immersion and seamless experience of social objects in AIO may be enhanced, composite requirements of the social objects for chatting and emotional expression during social interaction may be met, and object information of the social objects may also be effectively protected; and on the other hand, social interactions between the social objects have more intuitive visual feedback by virtue of advantages of virtual images and 3D vision of real scene rooms, and controlling the virtual images to perform different social interactive operations enriches the display effect of the virtual images and increases the fun of social interactions.

Figure 11:
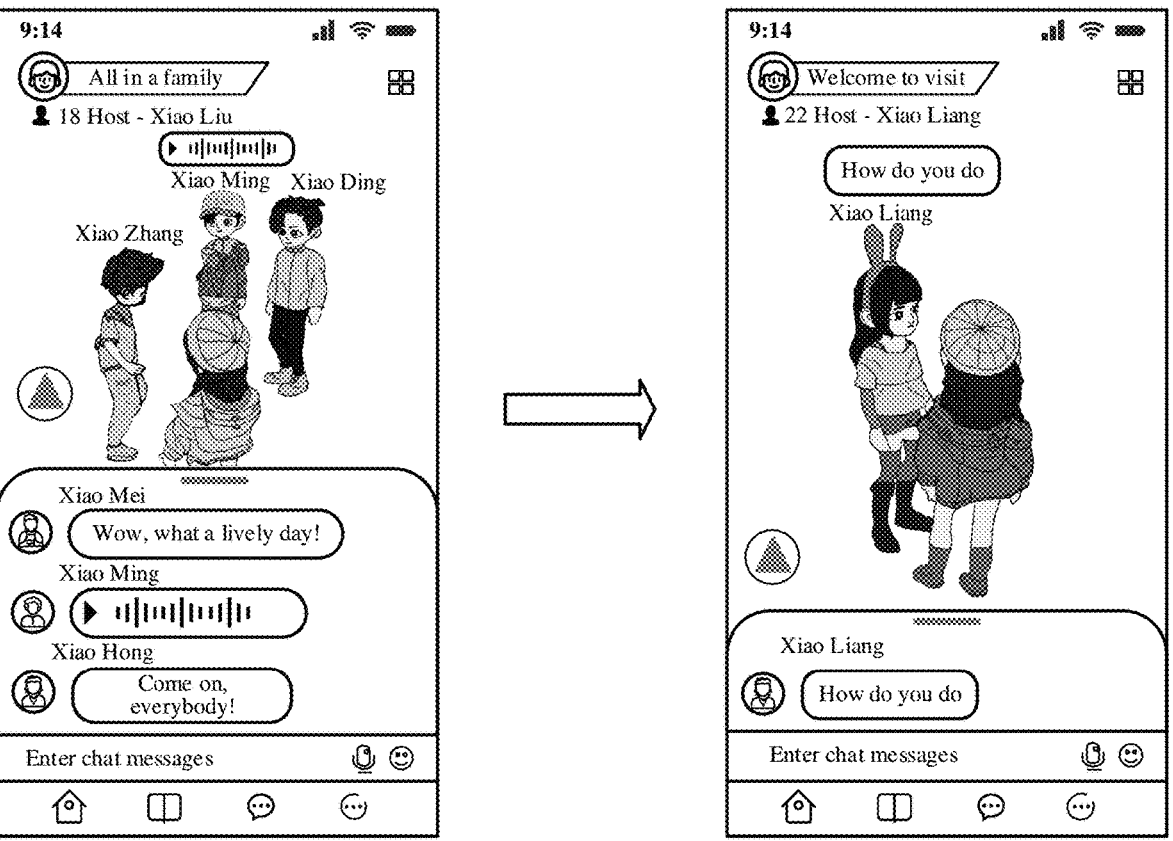
FIG. 11 is a schematic flowchart of another social interaction method according to an example of the present subject matter.

Refer to FIG. 11. FIG. 11 is a flowchart of another social interaction method according to an example of the present subject matter. The method may be executed by a computer device, and the computer device may include devices with display functions, such as a personal computer, a notebook computer, a smart phone, a tablet computer, a smart watch, an intelligent voice interaction device, a smart appliance, an on-board computer device, an intelligent wearable device, and an aircraft. The method includes the following steps.

S401: Display a social service page.

In the example of the present subject matter, a specific implementation of step S401 may refer to the description of the corresponding example in FIG. 2, and details are not repeated here.

S402: Switch a first real scene room to a second real scene room in the social service page.

In the example of the present subject matter, the social service page corresponds to a room display list, the room display list includes a plurality of orderly real scene rooms to be displayed, each real scene room corresponds to a virtual social scene, and the first real scene room may be switched to the second real scene room on the social service page.

In an example, sorting in the room display list may be any of the following: (1) sorting according to degrees of matching between virtual social scenes corresponding to the plurality of real scene rooms separately and object labels of target social objects, for example, from high to low degrees of matching, where the object labels may include, for example, interaction preference content set by the target social objects, and may also include content for describing features of the target social objects; and (2) sorting according to attention levels of social scenes corresponding to the plurality of real scene rooms separately, where an attention level of a social scene may refer to a quantity of social objects participating in social interaction in the social scene.

In an example, the first real scene room displayed on the social service page may be anyone in the room list. In response to a switching operation for the first real scene room, the first real scene room may be switched to the second real scene room in the room display list. The second real scene room may be a real scene room sorted before the first real scene room in the room display list, or may be a real scene room sorted after the first real scene room in the room display list, or may be a randomly obtained real scene room in the room display list. Specifically, Switching the first real scene room to the second real scene room in the social service page may include any of the following cases: 1. The first virtual social scene in the social service page is switched to the second virtual social scene in response to receiving a room switching operation in a display process of the first virtual social scene, where the room switching operation may include but is not limited to a sliding operation, a gesture operation, a control operation, a floating gesture operation, a voice operation, and the like. 2. The first virtual social scene in the social service page is switched to the second virtual social scene when display duration of the first virtual social scene reaches preset duration, where the display duration of the first real scene room may be a fixed value set by the target social object, and the real scene room may be automatically switched when the display duration reaches the set value. 3. The first virtual social scene in the social service page is switched to the second virtual social scene if any social interactive operation on the first virtual social scene is not received within the preset duration. There is no social interactive operation in the first virtual social scene within a preset time range, indicating that the target social object may not be interested in the social interaction in the first virtual scene. In this case, the real scene room may also be automatically switched. A specific case of switching between real scene rooms may be determined by settings of the target social object, and is not limited here.

In an example, when the first real scene room is switched to the second real scene room on the social service page, a current network environment may be detected, and a display mode of the second real scene room may be determined based on the current network environment. Specifically, if the current network environment is a first network environment, such as a smooth network environment, the second real scene room may be directly loaded, and the first real scene room may be switched to the second real scene room on the social service page. If the current network environment is a second network environment, such as a weak network environment, a snapshot page associated with the social service page may be displayed. The snapshot page may be recorded from the social service page at a preset time interval in the second real scene room in a historical display process of the social service page. The target social object may be enabled to quickly learn a basic theme and social interaction in the second real scene room. Weak network environment prompt information may be displayed, so that the target social object can adjust the network environment in a timely manner. When the network environment restores to a smooth network environment, the second real scene room may be loaded. If there is currently no network environment, unconnected prompt information may be displayed, and an all-detail revealing image is displayed on the social service page. The all-detail revealing image refers to a preset default image for loading failure. The first network environment and the second network environment are determined according to network bandwidths or network speeds. When the network bandwidth is lower than a bandwidth threshold or the network speed is lower than a speed threshold, the second network environment is determined, otherwise the first network environment is determined.

According to the method provided in this example, N real scene rooms are sorted according to their degrees of matching with object labels, and more matching real scene rooms are displayed to target social objects preferentially, thereby improving the effectiveness of display of the real scene rooms.

According to the method provided in this example, N real scene rooms are stored according to their attention levels, and real scene rooms with high attention levels are displayed to target social objects preferentially, thereby improving the accuracy of display of the real scene rooms.

According to the method provided in this example, the first real scene room and the second real scene room are switched upon receiving a room switching operation, thereby improving switching efficiency between the real scene rooms.

According to the method provided in this example, the first real scene room and the second real scene room are automatically switched if any room switching operation is not received within the preset duration, thereby improving the switching efficiency between the real scene rooms.

Figure 12:
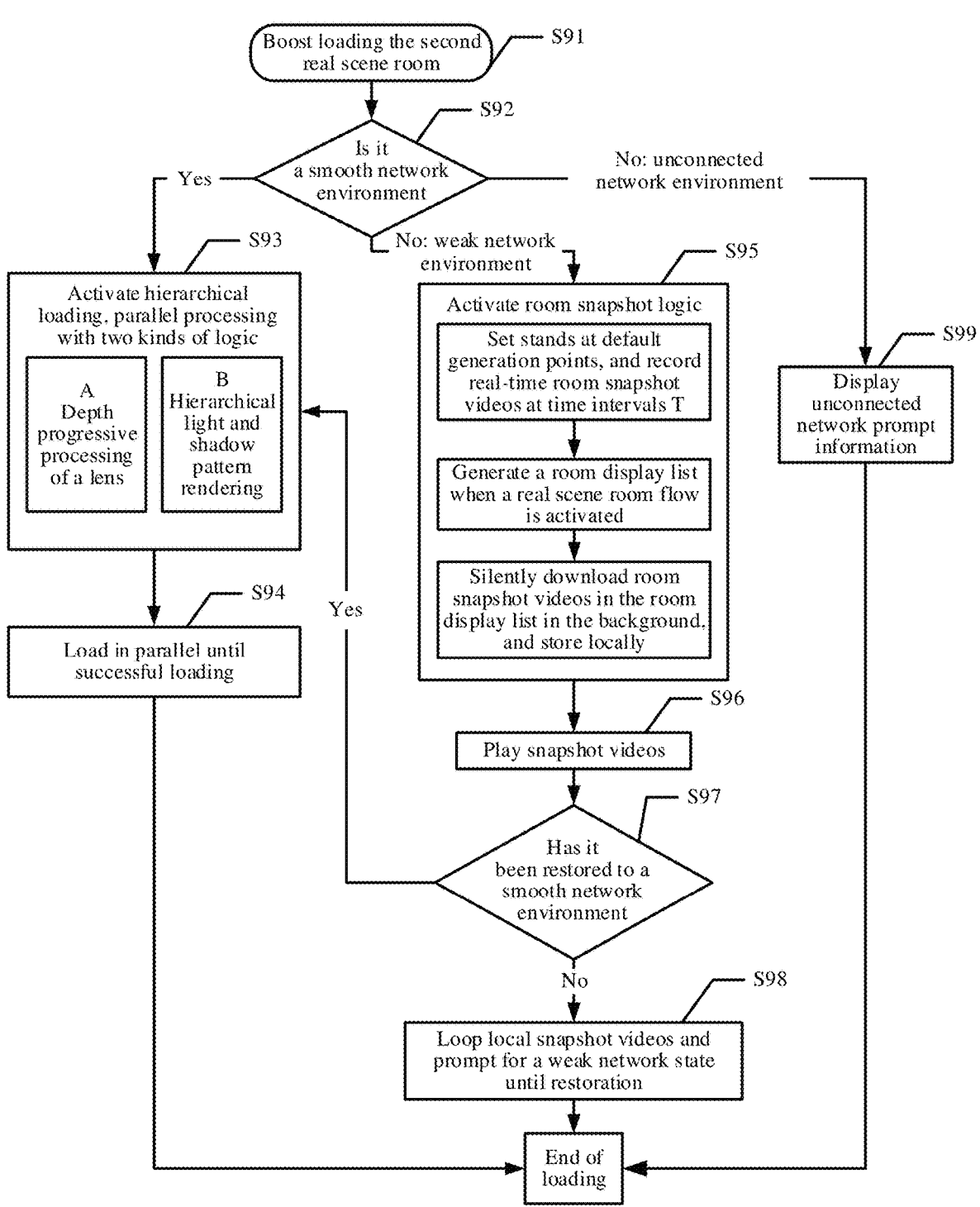
FIG. 12 is a schematic flowchart of switching a real scene room according to an example of the present subject matter.

In an example, switching the first real scene room to the second real scene room in the room display list may be implemented through the steps shown in FIG. 12.

S91: Boost loading the second real scene room.

S92: Determine whether the current network environment is a smooth network environment. In the process of switching the first real scene room to the second real scene room, when loading of the second real scene room is boosted, whether the current network environment is a smooth network environment may be determined, so as to call different room loading logics according to different network environments. S93 below is performed when the determination result in S92 is a smooth network environment. If the current network environment is not a smooth network environment, different processing is performed according to a specific situation of the actual network environment. S99 below is performed in the absence of a network environment, and S95 below is performed in a weak network environment. Whether the current network environment is a smooth network environment may be determined according to a network bandwidth or a network speed, and an unconnected network environment or a weak network environment is determined according to the network environment or the network speed, where the analysis and determination may be performed according to different thresholds.

S93: Activate hierarchical loading logic.

If the current network environment is a smooth network environment, the hierarchical loading logic may be activated. The hierarchical loading logic may include the following two aspects.

(1) In the second real scene room, a target virtual image may be generated at the default initial generation point. The target virtual image is generated based on a default shooting angle of a virtual lens. When the second real scene room is initially loaded, scene content of the virtual social scene in a nearby area of the target virtual image may be displayed based on the default shooting angle. The nearby area may be an area at a fixed distance from the target virtual image, As the loading process progresses, the display range gradually expands, that is, the depth and field of view of the virtual lens continue to expand, and the loading progresses until the scene content of the virtual social scene may be displayed globally.

Figure 13:
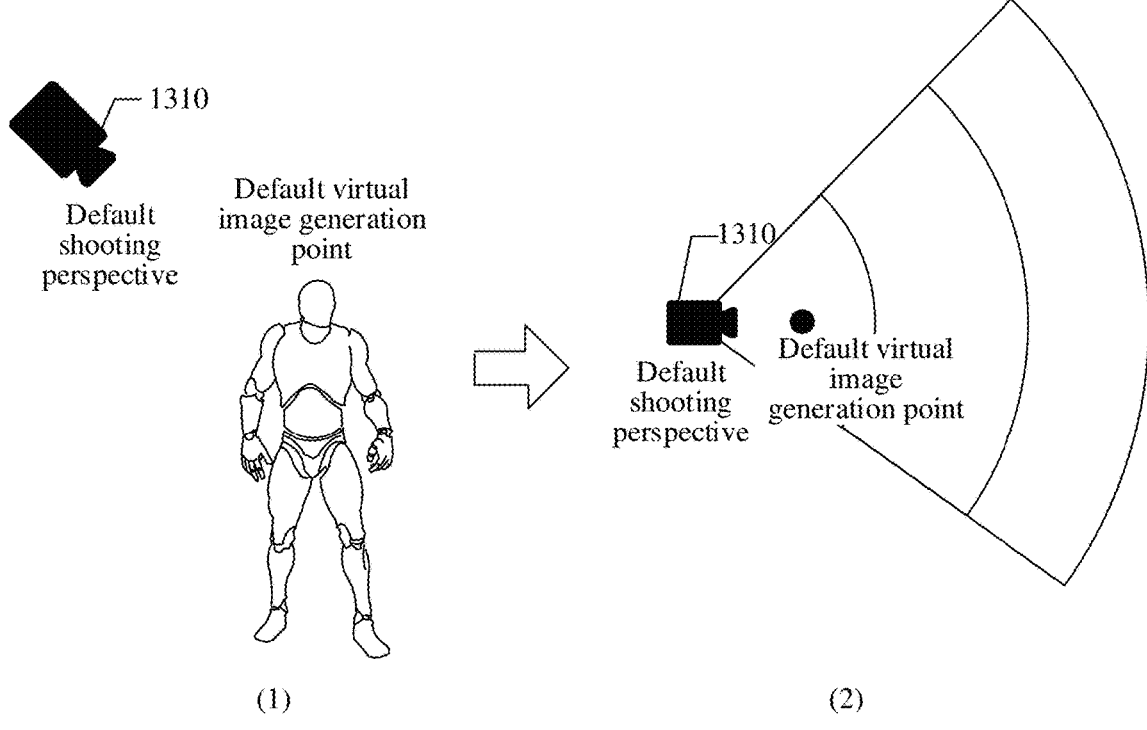
FIG. 13 is a schematic diagram of hierarchical loading according to an example of the present subject matter.

Refer to FIG. 13, which is a schematic diagram of hierarchical loading according to an example of the present subject matter. FIG. 13(1) shows a schematic diagram of generating a target virtual image at a default initial generation point based on a default shooting perspective of a virtual lens 1310, and FIG. 13(2) shows a schematic diagram of continuous expansion of the depth and field of view of the virtual lens 1310 as a loading process progresses.

(2) The gradual expansion of the display range as the loading process progresses in the foregoing first aspect may be matched with hierarchical rendering in a light and shadow pattern to load 3D scene assets in the nearby area of the target virtual image preferentially, and other areas that are not displayed in the range may be displayed in a fog state. When the display range is enlarged, layer-by-layer caching rendering may also be performed in the light and shadow pattern. For example, scene content may be first inserted in a white mode (namely, uncolored), and single map rendering without light and shadow is performed. For example, advertising banners, virtual image decorations, and the like belong to the single map rendering. Then, global light rendering effects are gradually superimposed according to the continuous expansion of the depth and field of view of the virtual lens.

Figure 14:
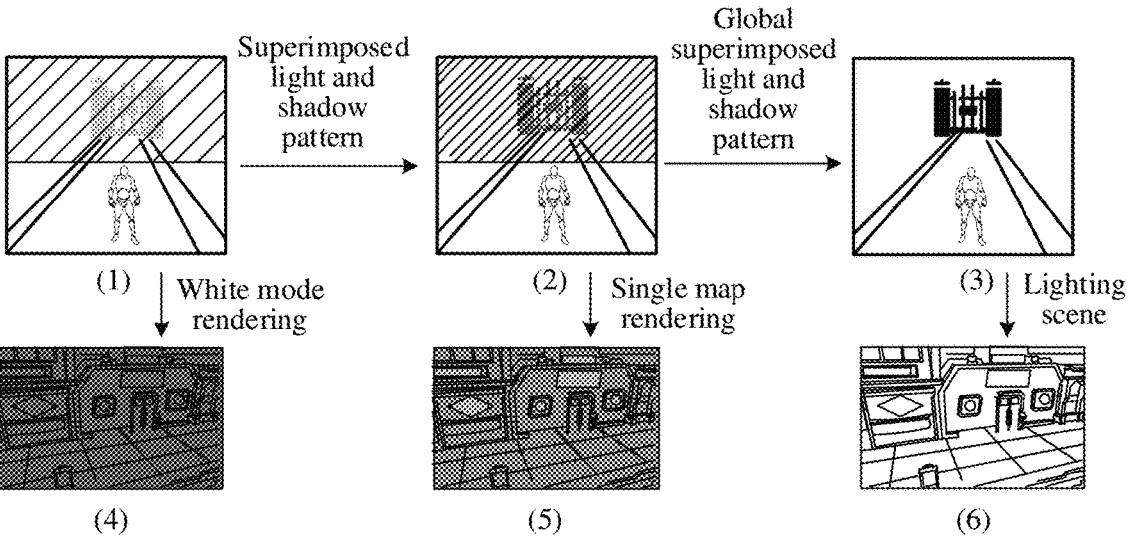
FIG. 14 is a schematic diagram of light and shadow pattern rendering according to an example of the present subject matter.

Refer to FIG. 14, which is a schematic diagram of light and shadow pattern rendering according to an example of the present subject matter. FIG. 14(1) shows a schematic diagram of light and shadow pattern rendering on a nearby area of a target virtual image; FIG. 14(2) shows a schematic diagram of gradually superimposing the light and shadow pattern rendering according to the depth of a virtual lens as the loading process progresses; FIG. 14(3) shows a schematic diagram of global superimposed light and shadow pattern rendering; FIG. 14(4) shows a schematic diagram of white mode rendering; FIG. 14(5) shows a schematic diagram of single map rendering; and FIG. 14(6) shows a schematic diagram of a lighting scene.

S94: Load in parallel until successful loading.

In the loading process of the second real scene room, depth parallel processing of the virtual lens and hierarchical light and shadow pattern rendering may be performed at the same time.

S95: Activate room snapshot logic.

If the current network environment is determined as a weak network environment, the room snapshot logic may be activated. The room snapshot logic may specifically include the following three aspects:

(1) A snapshot video of preset duration may be recorded at a default generation point of a virtual image in the second real scene room based on a preset time interval, and the snapshot video is stored locally for direct call and playback when needed. The snapshot video corresponding to the current time node may cover the snapshot video corresponding to the previous time node. This may ensure that the content of the snapshot video is latest social interaction in the second real scene room.

(2) When target social objects switch real scene rooms, a room display list may be generated. The room display list includes a plurality of orderly real scene rooms to be displayed. For example, a display order of the room list may be based on degrees of matching between object labels of the target social objects and the real scene rooms, for example, from high to low degrees of matching.

(3) Snapshot videos corresponding to a plurality of real scene rooms may be downloaded in advance according to the display order of the room list and stored locally for calling. For example, snapshot videos corresponding to the first three real scene rooms may be downloaded.

In an example, the foregoing room snapshot logic may also be used for loading when a quantity of social objects participating in social interaction in a room exceeds a threshold and the social objects need to queue up to enter the room.

S96: Play snapshot videos. If the current network environment is determined as a weak network environment, the snapshot videos generated based on the foregoing room snapshot logic may be played, so that the social objects quickly learn the social interaction in the second real scene room.

S97: Determine whether the smooth network environment has been restored. If the smooth network environment has been restored, S93 above may be triggered to activate the foregoing hierarchical loading logic, and the second real scene room may be loaded and displayed. If the smooth network environment has not been restored, S98 below may be performed.

S98: Loop local snapshot videos and prompt for a weak network state until restoration.

S99: Display unconnected prompt information.

By implementing the example of the present subject matter, on the one hand, virtual images may be combined with real scene rooms that are close to the real world, and social objects are enabled to have more intuitive interactive feedback in interactive virtual social scenes by using the virtual images, thereby enhancing immersion of the social objects during interaction.

On the other hand, when different real scene rooms are switched, smooth switching may be ensured through hierarchical loading logic and room snapshot logic, thereby effectively improving operational efficiency of switching the real scene rooms and further increasing experience of the social objects.

FIG. 15 is a schematic structural diagram of a social interaction apparatus according to an example of the present subject matter. The social interaction apparatus may be a computer program (including program code) run in a computer device. For example, the social interaction apparatus is application software. The social interaction apparatus may be used to perform the corresponding steps in the method provided in the examples of the present subject matter. As shown in FIG. 15, the social interaction apparatus 500 includes: a display module 501 and a processing module 502.

The display module 501 is configured to display a social service page.

The processing module 502 is configured to display a target virtual image corresponding to a target social object in a first virtual social scene in response to receiving an interactive operation on the first virtual social scene.

In an example, the social service page corresponds to a room display list, and the room display list includes N orderly real scene rooms to be displayed, where N is a positive integer; each real scene room is used to display a virtual social scene separately; and the first real scene room is anyone in the room display list. Sorting of the N real scene rooms in the room display list includes any of the following: sorting according to degrees of matching between virtual social scenes corresponding to the N real scene rooms separately and object labels of target social objects; or sorting according to attention levels of virtual social scenes corresponding to the N real scene rooms separately.

In an example, the room display list further includes a second real scene room, the second real scene room being used to display a second virtual social scene; and the processing module 502 is specifically configured to: switch the first virtual social scene to the second virtual social scene on the social service page.

In an example, the processing module 502 is further configured to: switch the first virtual social scene in the social service page to the second virtual social scene in response to receiving a room switching operation in a display process of the first virtual social scene; or switch the first virtual social scene in the social service page to the second virtual social scene when display duration of the first virtual social scene reaches preset duration.

In an example, the processing module 502 is further configured to: switch the first virtual social scene in the social service page to the second virtual social scene if any social interactive operation on the first virtual social scene is not received within the preset duration. The room switching operation includes any of a sliding operation, a gesture operation, a control operation, a floating gesture operation, and a voice operation.

In an example, the display module 501 is further configured to display a social session flow of the first virtual social scene in the social service page in the display process of the first virtual social scene, the social session flow including social session messages generated by social objects in the first virtual social scene.

In an example, the first real scene room contains M virtual images engaging in social interaction in the first virtual social scene, where M is a positive integer; the social session flow of the first virtual social scene contains one or more social session messages generated by the M virtual images during social interaction; and the social session message includes: any or more of text, an expression, voice, a video, an image, and a link.

In an example, a virtual control is displayed in the first real scene room; and the processing module 502 is specifically configured to: display the target virtual image corresponding to the target social object in the first virtual social scene in response to receiving a trigger operation on the virtual control in the first real scene room.

In an example, the first real scene room contains M virtual images engaging in social interaction in the first virtual social scene, where M is a positive integer; and the processing module 502 is specifically configured to: display the target virtual image corresponding to the target social object in the first virtual social scene in response to receiving an interactive operation initiated for a reference virtual image among the M virtual images.

In an example, the first virtual scene contains a virtual prop, and the processing module 502 is specifically configured to: display the target virtual image corresponding to the target social object in the first virtual social scene in response to receiving a trigger operation on the virtual prop. The trigger operation of the target social object on the virtual prop includes any of a click trigger operation, a voice trigger operation, and a gesture trigger operation.

In an example, the processing module 502 is further configured to display the target virtual image corresponding to the target social object in the first virtual social scene in response to receiving a sending operation on a social session message in the first virtual social scene.

In an example, the processing module 502 is further configured to control the target virtual image to engage in social interaction in the first virtual social scene.

In an example, the processing module 502 is further configured to display, upon receiving a social session message sent by the target social object in the first virtual social scene, the social session message at a preset position on the periphery of the target virtual image in the first real scene room.

In an example, the processing module 502 is further configured to control the target virtual image to perform a group of object actions corresponding to target interactive content when the social session message sent by the target social object contains the target interactive content.

In an example, the processing module 502 is further configured to control the target virtual image to perform a group of object actions corresponding to an action option which is selected by the target virtual image in the first virtual social scene.

In an example, the first virtual scene contains virtual props, and the virtual props have interactive attributes; and the processing module 502 is further configured to control the target virtual image to trigger a virtual prop, so as to trigger interactive content that matches the interactive attribute of the virtual prop.

In an example, the virtual props include a first type of virtual props, and the interactive attributes of the first type of virtual props are used to indicate scene form change information of the first virtual social scene; and the processing module 502 is specifically configured to: update a scene form of the first virtual social scene according to the interactive attributes of the first type of virtual props.

In an example, the virtual props include a second type of virtual props, and the interactive attributes of the second type of virtual props are used to indicate object actions that one or more virtual images in the first virtual social scene are to perform; and the processing module 502 is specifically configured to: control the one or more virtual images in the first virtual social scene to perform corresponding object actions according to the interactive attributes of the second type of virtual props.

In an example, the virtual props include a third type of virtual props, and the interactive attributes of the third type of virtual props are used to indicate feedback operations supported for the triggered virtual props; and the processing module 502 is specifically configured to: receive feedback operations on the triggered third type of virtual props according to the interactive attributes of the third type of virtual props.

In an example, the first virtual social scene contains a social activity area, or the first virtual social scene contains an entry for a social activity; and the processing module 502 is specifically configured to: display an activity page of the social activity in a case that the first virtual social scene contains the social activity area and the target virtual image enters the social activity area, so that the target virtual image joins in the social activity through the activity page; or display an activity page of the social activity in a case that the first virtual social scene contains the entry for the social activity and the target virtual image triggers the entry for the social activity, so that the target virtual image joins in the social activity through the activity page.

In an example, the first real scene room is a theme customized room; and the processing module 502 is specifically configured to: output an option related to a customized theme; and in response to triggering on the option, update the display form of the target virtual image to match the triggered option.

In an example, the processing module 502 is further configured to: update scene content of the first virtual social scene when a virtual perspective of the target virtual image in the first real scene room changes, where the change in the virtual perspective includes: any of change in a focal length of the virtual perspective, change in an angle of the virtual perspective, and change in a position of the target virtual image.

In an example, the processing module 502 is further configured to: obtain a display attribute of the target virtual image in response to receiving an interactive operation on the first virtual social scene; and display the target virtual image in a transparent state in the first real scene room if the display attribute of the target virtual image is a hidden attribute; or display the target virtual image in a non-transparent state in the first real scene room if the display attribute of the target virtual image is an explicit attribute.

In an example, the processing module 502 is further configured to: detect a network environment in response to a display instruction on the social service page; and display the social service page if the network environment is a first network environment; or display a snapshot page associated with the social service page if the network environment is a second network environment, and replace the snapshot page with the social service page when the network environment changes to the first network environment; or display unconnected prompt information in the absence of a network environment, where the snapshot page is recorded from the social service page at a preset time interval in a historical display process of the social service page.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module.

Further, modules can be implemented across multiple devices and/or other components local or remote to one another. Additionally, modules can be moved from one device and added to another device, and/or can be included in both devices and stored in memory or non-transitory computer readable medium.

FIG. 16 is a schematic structural diagram of a computer device according to an example of the present subject matter. The computer device may include: a network interface 601, a memory 602, and a processor 603. The network interface 601, the memory 602, and the processor 603 are connected through one or more communication buses, and the communication buses are used to implement connection and communication between the components. The network interface 601 may include a standard wired interface or wireless interface (such as a WIFI interface). The memory 602 may include a volatile memory such as a random-access memory (RAM); the memory 602 may alternatively include a non-volatile memory such as a flash memory or a solid-state drive (SSD); and the memory 602 may alternatively include a combination of the foregoing types of memories. The processor 603 may be a central processing unit (CPU). The processor 603 may further include a hardware chip. The foregoing hardware chip may be an application-specific integrated circuit (ASIC), a programmable logic device (PLD), or the like. The PLD may be a field-programmable gate array (FPGA), a generic array logic (GAL), or the like.

The memory 602 is further used to store program instructions, and the processor 603 may further call the program instructions to implement related methods and steps in the present subject matter.

Moreover, an example of the present subject matter further provides a non-transitory computer-readable storage medium, storing a computer program, the method provided by the foregoing examples being implemented when the computer program is performed by a processor.

An example of the present subject matter further provide a computer program product or a computer program, the computer program product or the computer program including computer instructions, and the computer instructions being stored in a non-transitory computer-readable storage medium. A processor of a computer device reads the computer instructions from the non-transitory computer-readable storage medium, the processor performs the computer instructions, and the computer device is enabled to perform the method provided in the foregoing examples.

The steps of the methods in the examples of the present subject matter may be reordered, combined, or deleted according to an actual requirement.

The units of the apparatuses in the examples of the present subject matter may be combined, divided, or deleted according to an actual requirement.

A person of ordinary skill in the art may understand that all or some of the processes of the methods in the foregoing examples may be implemented by a computer program instructing relevant hardware. The program may be stored in a non-transitory computer-readable storage medium. When the program is performed, the processes of the foregoing method examples are performed. The foregoing storage medium may be any non-transitory medium, such as a magnetic disc, an optical disc, a read-only memory (ROM), a random access memory (RAM), or the like.

What is claimed is:

1. A social interaction method, performed by a terminal, the method comprising:
displaying a social service page comprising a first real scene room and a room display list, wherein
the room display list lists a second real scene room,
the first real scene room corresponds to a first virtual social scene, and
the second real scene room corresponds to a second virtual social scene;
displaying a target virtual image corresponding to a target social object in the first virtual social scene in response to receiving an interactive operation on the first virtual social scene, wherein the target social object is controlled by the terminal; and
switching the first virtual social scene in the social service page to the second virtual social scene when any social interactive operation on the first virtual social scene is not received within a preset duration.

2. The method according to claim 1, wherein
the room display list comprises N orderly real scene rooms to be displayed, wherein Nis a positive integer,
each orderly real scene room is used to display a virtual social scene separately, and a first orderly real scene room being any one of the room display list; and
sorting of the N orderly real scene rooms in the room display list comprises one or more of the following:
sorting according to degrees of matching between virtual social scenes corresponding to the N orderly real scene rooms separately and object labels of target social objects, or sorting according to attention levels of virtual social scenes corresponding to the N orderly real scene rooms separately.

3. The method according to claim 2, further comprising:

switching the first virtual social scene in the social service page to the second virtual social scene in response to receiving a room switching operation in a display process of the first virtual social scene, or switching the first virtual social scene in the social service page to the second virtual social scene when display duration of the first virtual social scene reaches the preset duration.

4. The method according to claim 3, further comprising:

displaying a social session flow of the first virtual social scene in the social service page in the display process of the first virtual social scene, wherein the social session flow comprises social session messages generated by social objects in the first virtual social scene.

5. The method according to claim 4, wherein the first real scene room contains M virtual images engaging in social interaction in the first virtual social scene, wherein M is a positive integer;

the social session flow of the first virtual social scene contains one or more social session messages generated by the M virtual images during social interaction; and the social session message comprises one or more of text, an expression, voice, a video, an image, or a link.

6. The method according to claim 1, wherein the displaying a target virtual image corresponding to a target social object in the first virtual social scene in response to receiving an interactive operation on the first virtual social scene comprises:

displaying the target virtual image corresponding to the target social object in the first virtual social scene in response to receiving a trigger operation on a virtual control in the first real scene room.

7. The method according to any one of claim 1, wherein the first real scene room contains M virtual images engaging in social interaction in the first virtual social scene, wherein M is a positive integer; and the displaying a target virtual image corresponding to a target social object in the first virtual social scene in response to receiving an interactive operation on the first virtual social scene comprises:

displaying the target virtual image corresponding to the target social object in the first virtual social scene in response to receiving an interactive operation initiated for a reference virtual image among the M virtual images.

8. The method according to claim 1, wherein the first virtual social scene contains a virtual prop; and the displaying a target virtual image corresponding to a target social object in the first virtual social scene in response to receiving an interactive operation on the first virtual social scene comprises:

displaying the target virtual image corresponding to the target social object in the first virtual social scene in response to receiving a trigger operation on the virtual prop, wherein the trigger operation of the target social object on the virtual prop comprises any of a click trigger operation, a voice trigger operation, or a gesture trigger operation.

9. The method according to claim 1, wherein the first virtual social scene comprises:

in response to receiving the interactive operation on the first virtual social scene, displaying the target virtual image corresponding to the target social object in the first virtual social scene.

10. The method according to claim 1, further comprising:

controlling the target virtual image to engage in social interaction in the first virtual social scene.

11. The method according to claim 10, wherein the controlling the target virtual image to engage in social interaction in the first virtual social scene comprises:

displaying, upon receiving a social session message transmitted by the target social object in the first virtual social scene, the social session message at a preset position on a periphery of the target virtual image in the first real scene room.

12. The method according to claim 11, wherein the controlling the target virtual image to engage in social interaction in the first virtual social scene comprises:

controlling the target virtual image to perform a group of object actions corresponding to target interactive content when the social session message transmitted by the target social object contains the target interactive content.

13. The method according to claim 10, wherein the controlling the target virtual image to engage in social interaction in the first virtual social scene comprises:

controlling the target virtual image to perform a group of object actions corresponding to an action option which is selected by the target virtual image in the first virtual social scene.

14. The method according to claim 10, wherein the first virtual social scene contains virtual props, and the virtual props have interactive attributes; and the controlling the target virtual image to engage in social interaction in the first virtual social scene comprises:

controlling the target virtual image to trigger a virtual prop to trigger interactive content that matches the interactive attribute of the virtual prop.

15. The method according to claim 14, wherein the virtual props comprise a first type of virtual props, the interactive attributes of the first type of virtual props are used to indicate scene form change information of the first virtual social scene, and the triggering interactive content that matches the interactive attribute of the virtual prop comprises:

updating a scene form of the first virtual social scene according to the interactive attributes of the first type of virtual props.

16. The method according to claim 14, wherein the virtual props comprise a second type of virtual props, the interactive attributes of the second type of virtual props are used to indicate object actions that one or more virtual images in the first virtual social scene are to perform, and the triggering interactive content that matches the interactive attribute of the virtual prop comprises:

controlling the one or more virtual images in the first virtual social scene to perform corresponding object actions according to the interactive attributes of the second type of virtual props.

17. The method according to claim 14, wherein the virtual props comprise a third type of virtual props, the interactive attributes of the third type of virtual props are used to indicate feedback operations supported for the triggered virtual props, and the triggering interactive content that matches the interactive attribute of the virtual prop comprises:

receiving feedback operations on the third type of virtual props according to the interactive attributes of the third type of virtual props.

18. The method according to claim 1, wherein the first virtual social scene contains a social activity area, or the first virtual social scene contains an entry for a social activity; and the method further comprises:

displaying an activity page of the social activity when the first virtual social scene contains the social activity area and the target virtual image enters the social activity area, so that the target virtual image joins in the social activity through the activity page; or displaying an activity page of the social activity when the first virtual social scene contains the entry for the social activity and the target virtual image triggers the entry for the social activity, so that the target virtual image joins in the social activity through the activity page.

19. The method according to claim 1, further comprising:

updating scene content of the first virtual social scene when a virtual perspective of the target virtual image in the first real scene room changes, wherein the change in the virtual perspective comprises any of change in a focal length of the virtual perspective, change in an angle of the virtual perspective, and change in a position of the target virtual image.

\*     \*     \*     \*     \*